US012738601B2

(12) United States Patent
Saeki

(10) Patent No.: US 12,738,601 B2
(45) Date of Patent: Sep. 15, 2026

(54) SEPARATOR HAVING FINE PATTERN, WOUND BODY, AND NON-AQUEOUS ELECTROLYTE BATTERY

(71) Applicant: Asahi Kasei Kabushiki Kaisha, Tokyo (JP)

(72) Inventor: Hiroyuki Saeki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 852 days.

(21) Appl. No.: 17/254,138

(22) PCT Filed: Jun. 19, 2019

(86) PCT No.: PCT/JP2019/024387

§ 371 (c)(1),
(2) Date: Dec. 18, 2020

(87) PCT Pub. No.: WO2020/004205

PCT Pub. Date: Jan. 2, 2020

(65) Prior Publication Data

US 2021/0249735 A1 Aug. 12, 2021

(30) Foreign Application Priority Data

Jun. 26, 2018 (JP) ................................ 2018-120551

(51) Int. Cl.
*H01M 50/463* (2021.01)
*H01M 10/0587* (2010.01)
(Continued)

(52) U.S. Cl.
CPC ..... *H01M 50/463* (2021.01); *H01M 10/0587* (2013.01); *H01M 50/443* (2021.01); *H01M 50/489* (2021.01); *H01M 50/491* (2021.01)

(58) Field of Classification Search
CPC ............ H01M 50/463; H01M 50/489; H01M 50/491; H01M 10/0587
See application file for complete search history.

(56) References Cited

U.S. PATENT DOCUMENTS

2006/0073380 A1* 4/2006 Kim et al. .............. H01M 2/14 429/129
2006/0281007 A1 12/2006 Tsutsumi et al.
(Continued)

FOREIGN PATENT DOCUMENTS

EP 2978046 A1 1/2016
JP S52-041839 A 3/1977
(Continued)

OTHER PUBLICATIONS

Wakisaka, WO2012133753 A1 EPO machine translation, 2012 (Year: 2012).*

(Continued)

*Primary Examiner* — Haroon S. Sheikh
*Assistant Examiner* — Kan Luo
(74) *Attorney, Agent, or Firm* — Morgan, Lewis & Bockius LLP

(57) ABSTRACT

A separator used for a non-aqueous electrolyte battery comprises a substrate, and a plurality of protruding patterns on at least one principal surface of the substrate, wherein the substrate includes one or more layers, and the value of T1/T2 is 0.3 or more where T1 is the distance between an approximately flat surface formed at the top of the protruding pattern and an approximately flat surface formed at the bottom of the protruding pattern, and T2 is the total thickness of the separator.

13 Claims, 4 Drawing Sheets

(51) Int. Cl.

| | |
|---|---|
| ***H01M 50/443*** | (2021.01) |
| ***H01M 50/489*** | (2021.01) |
| ***H01M 50/491*** | (2021.01) |

(56) References Cited

U.S. PATENT DOCUMENTS

| | | | | |
|---|---|---|---|---|
| 2008/0187825 | A1 | 8/2008 | Kawabata et al. | |
| 2010/0129720 | A1 | 5/2010 | Sako et al. | |
| 2013/0059192 | A1 | 3/2013 | Kajita et al. | |
| 2013/0084483 | A1 | 4/2013 | Lee et al. | |
| 2016/0336569 | A1* | 11/2016 | Mizuno | B32B 27/20 |
| 2020/0335759 | A1* | 10/2020 | Lane | H01M 50/489 |

FOREIGN PATENT DOCUMENTS

| | | | | | |
|---|---|---|---|---|---|
| JP | 2003-308821 | A | | 10/2003 | |
| JP | 2006-012788 | A | | 1/2006 | |
| JP | 2011-028883 | A | | 2/2011 | |
| JP | 2012-209197 | A | | 10/2012 | |
| JP | 2013-054972 | A | | 3/2013 | |
| JP | 5543715 | B2 | | 7/2014 | |
| JP | 2016-026371 | A | | 2/2016 | |
| JP | 2016184710 | A | * | 10/2016 | H01G 11/52 |
| WO | 2005/022674 | A1 | | 3/2005 | |
| WO | 2008/053898 | A1 | | 5/2008 | |
| WO | WO2012133753 | A1 | * | 10/2012 | H01M 2/18 |

OTHER PUBLICATIONS

Homma et al., JP2016184710 A, 2016 (Year: 2016).*

Supplementary European Search Report issued in corresponding European Patent Application No. 19824514.4 dated Jul. 6, 2021.

International Search Report issued in corresponding International Patent Application No. PCT/JP2019/024387 dated Sep. 10, 2019.

International Preliminary Report on Patentability and Written Opinion issued in corresponding International Patent Application No. PCT/JP2019/024387 dated Jan. 7, 2021.

* cited by examiner

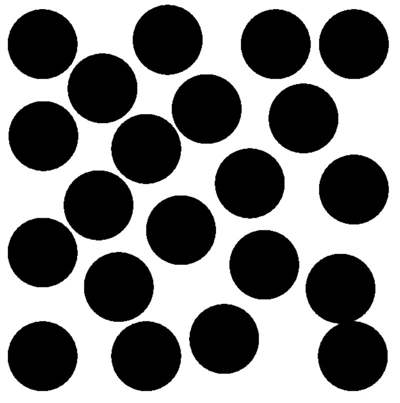
FIG. 2
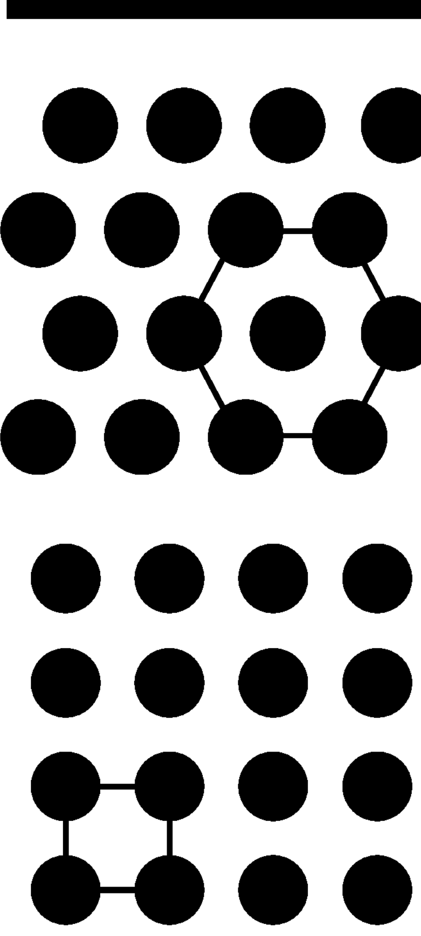

FIG. 4
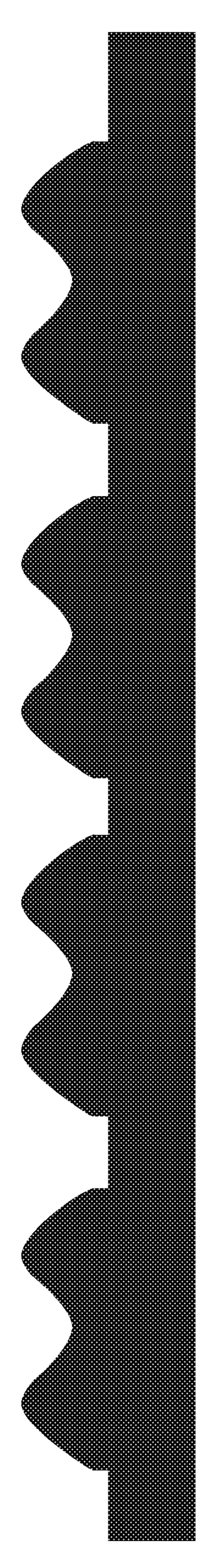

SEPARATOR HAVING FINE PATTERN, WOUND BODY, AND NON-AQUEOUS ELECTROLYTE BATTERY

FIELD

The present invention relates to a separator, etc., for use in a nonaqueous electrolyte battery.

BACKGROUND

With a recent development of electronic technologies or an increasing interest in the environmental technologies, a variety of electrochemical devices have come into use. In particular, there are many demands for energy saving, and expectations for a product contributing to energy saving are increasingly rising.

A lithium ion secondary battery that is a typical example of an electricity storage device and also a typical example of a nonaqueous electrolyte battery has conventionally been used mainly as a power source for small devices but, in recent years, it is attracting attention as a power source for hybrid vehicles and electric vehicles.

In a lithium ion secondary battery, the advancement of device performance is accompanied by the progress of high energy densification, and it becomes important to ensure reliability. In addition, the reliability needs to be ensured, among others, in a medium- or large-sized lithium ion secondary battery such as in-vehicle power source, compared with small devices. Furthermore, as the in-vehicle power source, a lithium ion secondary battery capable of maintaining the charge-discharge capacity over a long period of time in accordance with the product cycle is required.

In the lithium ion secondary battery, charge/discharge is effected by the movement of lithium (Li) ions between positive and negative electrodes. For the positive electrode, a lithium-containing transition metal oxide or a lithium-containing transition metal phosphoric acid compound, etc. is mainly used, and for the negative electrode, graphite or a silicon-based compound, etc. is mainly used. Such a material repeats expansion•contraction accompanying charge/discharge. In particular, Li is held in the negative electrode material during charge to cause expansion, and many of such materials generally have a large expansion rate. For example, in the case of a carbon material, specifically, graphite, charge occurs by the intercalation of Li between graphite layers. Intercalation of Li between graphite layers widens the interlayer distance, and the graphite crystal expands, as a result, a graphite particle having gathered therein graphite crystals expands. Despite a number of attempts to minimize the expansion of the graphite-containing negative electrode, it is fundamentally difficult to zero the expansion. Furthermore, utilization of a silicon-based material is also underway so as to increase the capacity density. However, the expansion contraction rate of the silicon-based material is large, compared with the above-described carbon material. When such a negative electrode material having a high expansion•contraction property is used, the expansion and contraction of the negative electrode greatly affects the expansion and contraction of the entire battery. Among others, in the case of a laminate cell, the effect is outstanding. In the laminate cell, the element participating in the suppression of expansion of the electrode stack or electrode roll inside the battery is an external pressure, a frictional force or adhesive force between positive electrode and separator, a frictional force or adhesive force between negative electrode and separator, or a gripping member such as tape for fixing the electrode stack or electrode roll, but even when such an element is used, displacement of the structure sometimes occurs. When displacement due to expansion and contraction is generated in the laminated structure of a stack consisting of a positive electrode, a separator and a negative electrode, a variation in the distance between positive and negative electrodes is caused, leading to non-uniform charge/discharge, and there may occur a phenomenon in which the lifetime is significantly reduced.

On the other hand, a side reaction also occurs accompanying the charge/discharge reaction. For example, it is commonly supposed that a decomposition product of the electrolytic solution inside the battery undergoes reduction and precipitates in the negative electrode. This reduction/precipitation also causes a change in volume of the battery or battery constituent member. Since this reduction/precipitation does not always occur uniformly, the above-described variation in the distance between electrodes is encouraged, which may also lead to non-uniform charge/discharge and bring about a reduction in the lifetime.

In a cylindrical battery or a square battery, expansion and contraction of an electrode laminate or electrode roll including a positive electrode, a separator and a negative electrode occurs as well. However, in a cylindrical battery or a square battery, the electrode laminate or electrode roll is inserted into a continuous metallic package and therefore, it is easy for the outer periphery and one end face of the battery to maintain the shape, compared with a laminate cell. Furthermore, in the case where thermal runaway of the battery occurs and results in a fire, the expansion energy by boiling, etc. of the electrolytic solution is concentrated at the open end, that is, the expansion energy is concentrated toward the lid direction. In the event of the lid being blown away, it is a relatively safe failure mode to permit an electrode laminate or electrode roll including a positive electrode, a separator and a negative electrode to stay in the metallic package. However, when a displacement due to expansion/contraction or reduction/precipitation of the electrolytic solution in the negative electrode is generated, that is, when a variation in the distance between electrodes is produced, the electrode laminate or electrode roll is disengaged and jumps outside the package, increasing the possibility of rendering the entire battery unit dangerous.

In recent years, it has been proposed to impart a pattern to a separator disposed between positive and negative electrodes to thereby suppress deformation of the separator and ensure safety of a battery unit. For example, Patent Literature 1 describes providing projections and recesses in a direction intersecting with a stretching direction on one surface of a uniaxially stretched separator; Patent Literature 2 describes providing grooves on at least one surface of a multilayer separator; Patent Literature 3 discusses projections formed on at least one surface of a polyolefin microporous membrane; and Patent Literature 5 describes forming projections and recesses along the transverse direction (TD) of a separator surface. However, the structures of the separators described in Patent Literatures 1, 2 and 5 are not enough to maintain the above-described structure of an electrode laminate or an electrode roll.

Incidentally, in Patent Literature 4, from the different viewpoint from the structure•dimensional stability of a battery or a battery constituent member, studies are made to form grooves in an organic-inorganic porous coating layer of a separator and thereby shorten the electrolytic solution impregnation time.

Furthermore, in Patent Literature 6, it is stated that when a separator has, on at least one surface, a porous membrane containing an inorganic oxide filler and a binder and the porous membrane has a partially formed projection part, overcharge can be avoided.

CITATION LIST

Patent Literature

[PTL 1] Japanese Unexamined Patent Publication (Kokai) No. 2016-184710
[PTL 2] Kokai No. 2012-209197
[PTL 3] Japanese Patent No. 5,543,715
[PTL 4] Kokai No. 2016-26371
[PTL 5] International Publication WO2005/022674
[PTL 6] Kokai No. 2006-12788

SUMMARY

Technical Problem

Considering these circumstances, in the structures of known separators, the performance of maintaining the structure of an electrode laminate or electrode roll including a positive electrode, a separator and a negative electrode was insufficient. Accordingly, an object of the present invention is to provide a separator capable of reducing displacement of an electrode laminate or electrode roll including a positive electrode, a separator and a negative electrode, and a lithium ion secondary battery having enhanced life characteristics.

Solution to Problem

The present inventors have discovered an efficient structure ensuring that winding deviation of an electrode laminate or an electrode roll can be suppressed by appropriately controlling the surface structure of the separator, and found that when a separator having this structure is used, a lithium ion secondary battery capable of remarkably enhancing the life characteristics and enhancing the safety can be realized. Furthermore, it has also been found that the structure is hardly disengaged when a transvers force is applied to a roll obtained by winding a separator having the surface structure of the present invention on a separator winding core, i.e., when a force is applied from the end face of a separator. The present invention has been accomplished based on these findings.

That is, the present invention is as follows.

[1]

A separator for use in a nonaqueous electrolyte battery, wherein

- the separator includes a substrate and, on at least one main surface of the substrate, a plurality of convex-shaped patterns,
- the substrate includes a single layer or a plurality of layers, and
- the value of T1/T2 represented using the distance (T1) between a substantially flat surface formed at the top of the convex-shaped patterns and a substantially flat surface formed at the bottom of the convex-shaped patterns and the total thickness (T2) of the separator is 0.3 or more.

[2]

The separator according to item 1, wherein the compressive modulus of the convex-shaped patterns is, when the substrate includes a plurality of layers, 2 times or more the compressive modulus of a layer having the lowest compressive modulus in the layers constituting the substrate and, when the substrate includes a single layer, 2 times or more the compressive modulus of the substrate.

[3]

The separator according to item 1 or 2, wherein S1/S2 represented using a ratio of the air permeability S1 of a portion having the convex-shaped patterns, measured in the vertical direction of the convex-shaped patterns, to the air permeability S2 of a non-pattern part of the separator is 0.8 or more and 5 or less.

[4]

The separator according to any one of items 1 to 3, wherein the ratio of the area surrounded by bottom portions of the convex-shaped patterns to the area of a unit grid is 0.03 or more and 0.80 or less.

[5]

The separator according to any one of items 1 to 4, wherein the distance (T1) between a substantially flat surface formed at the top of the convex-shaped patterns and a substantially flat surface formed at the bottom of the convex-shaped patterns is 6 μm or more.

[6]

The separator according to any one of items 1 to 5, wherein the numerical value Rp/rp represented using the diameter (Rp) of a circumscribed circle in contact with at least two points on the outline of one of the convex-shaped patterns and the diameter (rp) of an inscribed circle in contact with at least two points on the outline of one of the convex-shaped patterns is 1 or more and less than 10.

[7]

The separator according to any one of items 1 to 6, wherein the convex-shaped patterns contain inorganic particles or resin fine particles.

[8]

The separator according to item 7, wherein in a cross-section of one of the inorganic particles or one of the resin fine particles, including a vertical line of the separator, the numerical value Ri/ri represented using the diameter (Ri) of a circumscribed circle in contact with at least two points on the outline of one of the inorganic particles or one of the resin fine particles, and the diameter (ri) of an inscribed circle in contact with at least two points on the outline of one of the inorganic particles or one of the resin fine particles is more than 1 and less than 10.

[9]

The separator according to any one of items 1 to 8, wherein the value of T1/T2 is 1 or less.

[10]

A roll obtained by winding the separator according to any one of items 1 to 9 on a winding core.

[11]

A nonaqueous electrolyte battery comprising:

- a laminate having stacked therein a positive electrode, the separator according to any one of items 1 to 9, and a negative electrode, or a roll of the laminate; and
- a nonaqueous electrolyte.

Advantageous Effects of Invention

According to the present invention, a nonaqueous electrolyte battery such as lithium ion secondary battery, in which winding deviation of a laminate including electrodes and a separator is prevented, winding deviation or unwinding of a roll within a lithium ion secondary battery is suppressed, and consequently, both the life characteristics and safety are excellent, can be provided.

BRIEF DESCRIPTION OF DRAWINGS

FIG. 2 A schematic diagram illustrating a fine pattern of the separator according to one embodiment of the present invention, which is projected in a perpendicular direction from the main surface.

FIG. 4 A schematic diagram illustrating a shape having three or more inflection points in the convex part, which is one example of the fine pattern on the first surface of the separator according to one embodiment of the present invention.

DESCRIPTION OF EMBODIMENTS

Figure 1:
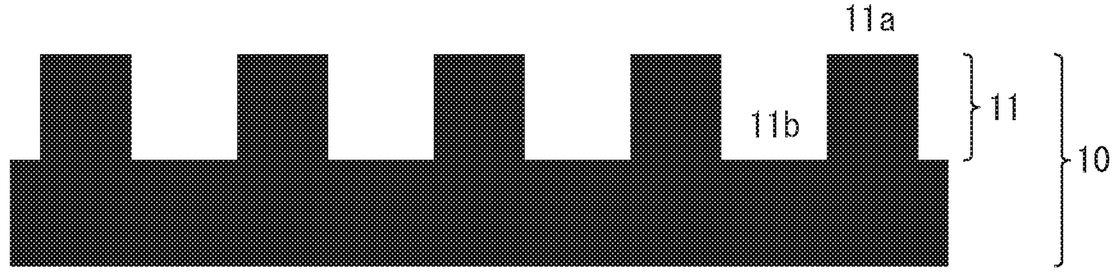
FIG. 1 A schematic diagram illustrating a fine pattern on the first surface of the separator according to one embodiment of the present invention.

The embodiment of the present invention (hereinafter, simply referred to as "present embodiment") is described in detail below.

One embodiment of the present invention is a separator for use in a nonaqueous electrolyte battery, and the separator has convex-shaped patterns on at least one surface.

First Embodiment: Separator

The separator used in the present embodiment has a substrate and, on at least one main surface of the substrate, a plurality of convex-shaped patterns.

[Substrate]

The substrate may sufficient if it has high ion permeability and has a function of electrically isolating a positive electrode and a negative electrode. Many conventional porous films used in a nonaqueous electrolyte battery can be used, and this is not particularly limited.

Specifically, a microporous membrane, a nonwoven fabric, etc., each composed of an electrochemically stable material that is stable to a nonaqueous electrolyte in the battery, such as polyolefin (e.g., polyethylene (PE), polypropylene (PP)), polyester, polyimide, polyamide and polyurethane, can be used as the substrate.

Incidentally, the substrate preferably has a property of closing its pores (i.e., shutdown function) at a temperature of preferably 80° C. or more (more preferably 100° C. or more) and preferably 180° C. or less (more preferably 150° C. or less). Therefore, it is more preferable to use, as the substrate, a microporous membrane or nonwoven fabric containing a polyolefin having a melting temperature, i.e., a melting temperature measured by means of a differential scanning calorimeter (DSC) in conformity with the prescription of JIS K 7121, of preferably 80° C. or more (more preferably 100° C. or more) and preferably 180° C. or less (more preferably 150° C. or less). In this case, the microporous membrane or nonwoven fabric serving as the substrate may be formed of only PE, may be formed of only PP, or furthermore, may contain two or more kinds of materials. In addition, the substrate may include a single layer or a plurality of layers and may be, for example, a laminate of a PE-made microporous membrane and a PP-made microporous membrane (e.g., PP/PE/PP three-layer laminate), or a laminate of a PE-made microporous membrane and a polyimide-made microporous membrane.

The substrate for use in the present invention may be a laminate of microporous membranes having different compositions or structures, but the compressive modulus of a layer having a lowest compressive modulus out of a plurality of microporous membranes (layers) constituting the substrate is preferably from 5 to 400 MPa. With a compressive modulus in this range, when sufficient deformation occurs in response to pushing into the convex part, the stability of a roll, an electrode laminate, or a roll obtained by winding an electrode laminate can be enhanced. More favorably, the upper limit is preferably 350 MPa or less, more preferably 300 MPa or less. In addition, the lower limit is more preferably 10 MPa or more, still more preferably 15 MPa or more.

In the case of measuring the compressive modulus of a layer having a lowest compressive modulus of the substrate, the layer may be taken out and measured by a microhardness tester.

More specifically, the compressive modulus of the substrate can be measured using a pushing depth set loading-unloading test mode by means of a dynamic ultra-micro-hardness tester (DUH-211S: Shimadzu Corporation) under the following conditions.

The substrate sample is cut out into a 1-cm square and fixed on a sample table with use of an adhesive (aqueous glue), and a planar indenter (made of diamond) of 50 μm in diameter is pushed at a speed of 0.4877 mN/sec to a depth corresponding to a load of 10 mN from a surface of the substrate and then (without a hold time), pulled back at a speed of 0.4877 mN/sec to the position subject to a load of 0 mN on the substrate surface. This loading-unloading cycle is repeated, and the compressive modulus is measured from an initial linear region of deformation of the substrate under load.

The air permeability of the substrate in the present embodiment is preferably 10 sec/100 ml or more and 500 sec/100 ml or less, more preferably 20 sec/100 ml or more and 450 sec/100 ml or less, still more preferably 30 sec/100 ml or more and 450 sec/100 ml or less. When the air permeability is 10 sec/100 ml or more, self-discharge tends to be more reduced at the time of using the separator in a nonaqueous electrolyte battery. In addition, when the air permeability is 500 sec/100 ml or less, better charge/discharge characteristics are likely to be obtained.

The air permeability of the substrate can be measured by applying a jig limiting the airflow region to a circle of 100 μm in dimeter to a Gurley air permeability tester in conformity with JIS P-8117. Due to narrowing of the airflow region, the measurement is subject to error, but this difference is calculated by correcting the area. More specifically, the measured air permeability is divided by $7.85\times10^{-3}$ mm$^2$ that is a cross-sectional area exposed to an airflow, and multiplied by 642 mm$^2$ that is a cross-sectional area specified in JIS P-8117, thereby calculating and figuring out the air permeability. As a simple method, measurements with respective cross-sectional areas are carried out using CG2500 manufactured by Celgard, Inc., and the ratio therebetween can be corrected.

The thickness of the substrate is preferably from 3 to 35 μm, more preferably from 4 to 30 μm, still more preferably from 5 to 25 μm. When the thickness of the substrate is 3 μm or more, there is a tendency that the elasticity of the separator increases and the stability of a separator roll, an electrode laminate, or a roll obtained by winding the electrode laminate is enhanced. In addition, when the thickness of the substrate is 35 μm or less, the battery capacity and the permeability tend to be more enhanced.

The membrane density of the substrate is preferably from 0.2 to 1.5 g/cm$^3$, more preferably from 0.3 to 1.2 cm$^3$. When the membrane density is 0.2 g/cm$^3$ or more, there is a tendency that the elasticity of the separator increases and the stability of a separator roll, an electrode laminate, or a roll obtained by winding the electrode laminate is enhanced. In addition, when the membrane density of the substrate is 1.5 g/cm$^3$ or less, the battery capacity and the permeability tend to be more enhanced. The substrate is not particularly limited but includes, for example, a polyolefin microporous membrane, a polyolefin microporous membrane, and a membrane including an inorganic layer disposed on at least one surface of the polyolefin microporous membrane.

(Polyolefin Microporous Membrane)

The polyolefin resin contained in the polyolefin microporous membrane is not particularly limited, but, for example, a homopolymer such as ethylene, propylene, 1-butene, 4-methyl-1-pentene, 1-hexene and 1-octene, and a copolymer, a multistage polymer, etc. thereof can be used. The polyolefin resin is not particularly limited but, more specifically, includes a low-density polyethylene, a linear low-density polyethylene, a medium-density polyethylene, a high-density polyethylene, an ultrahigh molecular weight polyethylene, an isotactic polypropylene, an atactic polypropylene, an ethylene-propylene random copolymer, a polybutene, an ethylene propylene rubber, etc.

In the case where the separator wounded is used as a separator for electricity storage devices, a resin having a low melting point and containing, as a main component, a high-density polyethylene with high strength is preferred.

It is also preferable to use polypropylene and a polyolefin resin except for polypropylene in combination. When such a polyolefin resin is used, the heat resistance of the separator tends to be more enhanced. Incidentally, the polypropylene is not particularly limited in its conformation but includes, for example, an isotactic polypropylene, a syndiotactic polypropylene, and an atactic polypropylene.

The content of the polypropylene is preferably from 1 to 35 weight %, more preferably from 3 to 20 weight %, still more preferably from 4 to 10 weight %, per 100 weight % of the polyolefin resin. When the content of the polypropylene is in the range above, both higher heat resistance and better shutdown function tend to be achieved.

The polyolefin resin except for polypropylene is not particularly limited but includes, for example, those described above. Among these, a polyethylene, a polybutene, an ethylene-propylene random copolymer, etc. are preferred. Among others, in view of shutdown characteristics of closing pores by thermal fusion, a polyethylene such as low-density polyethylene, linear low-density polyethylene, medium-density polyethylene, high-density polyethylene and ultrahigh molecular weight polyethylene is more preferred. In view of strength, it is still more preferable to use a polyethylene having a density of 0.93 g/cm$^3$ or more as measured in conformity with JIS K 7112.

As for the polyolefin resin, one type may be used alone, or two or more types may be used in combination.

The content of the polyolefin resin is preferably 50 weight % or more and 100 weight % or less, more preferably 60 weight % or more and 100 weight % or less, still more preferably 70 weight % or more and 100 weight % or less, per 100 weight % of the substrate. When the content of the polyolefin resin is in the range above, the shutdown performance in case of use as a separator for electricity storage devices tends to be more enhanced.

The viscosity average molecular weight of the polyolefin resin is preferably 30,000 or more and 12,000,000 or less, more preferably 50,000 or more and 2,000,000 or less, still more preferably 100,000 or more and 1,000,000 or less. When the viscosity average molecular weight is 30,000 or more, it is likely that the melt tension at the time of melt molding increases to impart good moldability to the substrate and the strength of the substrate becomes higher due to entanglement of polymers with each other. On the other hand, when the viscosity average molecular weight is 12,000,000 or less, there is a tendency that uniform melt kneading is facilitated and the sheet moldability, particularly thickness stability, is excellent. Furthermore, when the viscosity average molecular weight is 1,000,000 or less, the pores tend to be closed at the time of temperature rise to thereby obtain good shutdown function. Incidentally, instead of using a polyolefin having a viscosity average molecular weight of less than 1,000,000 alone, for example, a polyolefin resin mixture having a viscosity average molecular weight of less than 1,000,000, which is a mixture of a polyolefin having a viscosity average molecular weight of 2,000,000 and a polyolefin having a viscosity average molecular weight of 270,000, may also be used.

The substrate in the present embodiment may contain any additives. Such additives are not particularly limited but include, for example, a polymer other than a polyolefin resin; an inorganic particle; an organic particle; an antioxidant based on phenol, phosphorus, sulfur, etc.; metal soaps such as calcium stearate, zinc stearate, etc.; an ultraviolet absorber; a light stabilizer; an antistatic agent; an antifogging agent; and a color pigment.

In the case of incorporating inorganic particles or organic particles such as resin fine particle into a substrate, a separator having a single-layer structure can be formed by incorporating inorganic particles and/or resin fine particles into the above-described substrate.

The inorganic particle is preferably selected from the group consisting of sodium oxide, potassium oxide, magnesium oxide, calcium oxide, barium oxide, lanthanum oxide, cerium oxide, strontium oxide, vanadium oxide, $SiO_2$—MgO (magnesium silicate), $SiO_2$—CaO (calcium silicate), hydrotalcite, sodium carbonate, potassium carbonate, magnesium carbonate, calcium carbonate, barium carbonate, lanthanum carbonate, cerium carbonate, basic titanate, basic silicotitanate, basic copper acetate, basic lead sulfate; an anion adsorbent such as a layered double hydroxide (e.g., Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc.; a cation adsorbent such as zirconium phosphate, titanium phosphate, apatite, non-basic titanate, niobate, niobate·titanate, etc.; zeolite, a carbonate and a sulfate, such as calcium sulfate, magnesium sulfate, aluminum sulfate, gypsum, barium sulfate, etc.; oxide-based ceramics such as alumina trihydrate (ATH), fumed silica, precipitated silica, zirconia, yttria, etc.; nitride-based ceramics such as silicon nitride, titanium nitride, boron nitride, etc.; a layered silicate such as silicon carbide, talc, dickite, nacrite, halloysite, pyrophyllite, montmorillonite, sericite, amesite, bentonite, etc.; asbestos, diatomite, glass fiber, a synthetic layered silicate such as mica or fluoromica, and zinc borate. These may be used individually, or a plurality thereof may be used in combination.

In addition, the resin fine particle is preferably composed of an electrochemically stable resin having heat resistance and electrical insulation and being stable to a nonaqueous electrolyte in the battery and resistant to oxidation and reduction in the battery operating voltage range. Examples of the resin for forming such resin fine particles include a crosslinked body of at least one resin selected from the group consisting of a styrene resin (e.g., polystyrene), a styrene butadiene rubber, an acrylic resin (e.g., polymethyl methacrylate), a polyalkylene oxide (e.g., polyethylene oxide), a fluororesin (e.g., polyvinylidene fluoride) and derivatives thereof, a urea resin, a polyurethane, etc. For the resin fine particle, one of the resins exemplified above may be used alone, or two or more thereof may be used in combination. In addition, the resin fine particle may contain, if desired, known additives that can be added to a resin, for example, such as antioxidant, etc.

The shape of the inorganic particle or resin fine particle may be any of plate-like, scale-like, acicular, columnar, spherical, polyhedral and massive shapes, etc. As for the inorganic particle or resin fine particle having the above-described shape, one type may be used alone, two or more types may be used in combination. From the viewpoint of enhancing the permeability, a polyhedral shape composed of a plurality of faces is preferred.

In addition, as for the particle diameter of the inorganic particle or resin fine particle, the average particle diameter (D50) is preferably from 0.1 μm to 4.0 μm, more preferably from 0.2 μm to 3.5 μm, still more preferably from 0.4 μm to 3.0 μm. By adjusting the average particle diameter to such a range, thermal contraction at high temperatures tends to be further suppressed.

The total content of these additives is preferably 20 parts by weight or less, more preferably 10 parts by weight or less, still more preferably 5 parts by weight or less, per 100 parts by weight of the substrate. The lower limit value of the total content is not particularly limited and, for example, may be more than 0 parts by weight per 100 parts by weight of the substrate.

(Inorganic Layer)

The inorganic layer is not particularly limited but includes, for example, those containing an inorganic filler and a resin binder.

(Inorganic Filler)

The inorganic particle is preferably selected from the group consisting of sodium oxide, potassium oxide, magnesium oxide, calcium oxide, barium oxide, lanthanum oxide, cerium oxide, strontium oxide, vanadium oxide, $SiO_2$—MgO (magnesium silicate), $SiO_2$—CaO (calcium silicate), hydrotalcite, sodium carbonate, potassium carbonate, magnesium carbonate, calcium carbonate, barium carbonate, lanthanum carbonate, cerium carbonate, basic titanate, basic silicotitanate, basic copper acetate, basic lead sulfate; an anion adsorbent such as a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc.; a cation adsorbent such as zirconium phosphate, titanium phosphate, apatite, non-basic titanate, niobate, niobate·titanate, etc.; zeolite, a carbonate and a sulfate, such as calcium sulfate, magnesium sulfate, aluminum sulfate, gypsum, barium sulfate, etc.; oxide-based ceramics such as alumina trihydrate (ATH), fumed silica, precipitated silica, zirconia, yttria, etc.; nitride-based ceramics such as silicon nitride, titanium nitride, boron nitride, etc.; a layered silicate such as silicon carbide, kaolinite, talc, dickite, nacrite, halloysite, pyrophyllite, montmorillonite, sericite, amesite, bentonite, etc.; asbestos, diatomite, glass fiber, a synthetic layered silicate such as mica or fluoromica, and zinc borate. These may be used individually, or a plurality thereof may be used in combination.

Among these, from the viewpoint of enhancing the electrochemical stability and the heat resistance properties, an aluminum oxide compound such as alumina and boehmite; or an aluminum silicate compound having no ion exchange capacity, such as kaolinite, dickite, nacrite, halloysite, and pyrophyllite, is preferred. As the aluminum oxide compound, aluminum oxide hydroxide is preferred. As the aluminum silicate compound having no ion exchange capacity, kaolin mainly composed of a kaolin mineral is preferred, because this is inexpensive and easily available. Kaolin includes wet kaolin and calcined kaolin obtained by calcining the wet kaolin, but calcined kaolin is preferred in view of electrochemical stability, because during the calcination treatment, water of crystallization is released and moreover, impurities are removed.

The shape of the inorganic filler is not particularly limited and includes, for example, plate-like, scale-like, acicular, columnar, spherical, polyhedral and massive shapes, etc., and a plurality of types of inorganic fillers having the above-described shapes may be used in combination. Among these, a polyhedral shape composed of a plurality of faces, a columnar shape, and a spindle shape are preferred. By using such an inorganic filler, the permeability tends to be more enhanced.

The content of the inorganic filler is preferably 50 weight % or more and less than 100 weight %, more preferably 70 weight % or more and 99.99 weight % or less, still more preferably 80 weight % or more and 99.9 weight % or less, yet still more preferably 90 weight % or more and 99 weight % or less, per 100 weight % of the inorganic layer. When the content of the inorganic filler is in the range above, the binding property of the inorganic filler and the permeability, heat resistance, etc. of the multilayer porous membrane tend to be more enhanced.

(Resin Binder)

The resin binder is not particularly limited, but it is preferable to use those insoluble in an electrolytic solution of a lithium ion secondary battery and electrochemically stable in the use range of the lithium ion secondary battery. Such a resin binder is not particularly limited but includes, for example, a polyolefin such as polyethylene, polypropylene, etc.; a fluorine-containing resin such as polyvinylidene fluoride, polytetrafluoroethylene, etc.; a fluorine-containing rubber such as a vinylidene fluoride-hexafluoropropylene-tetrafluoroethylene copolymer, an ethylene-tetrafluoroethylene copolymer, etc.; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, polyvinyl acetate, etc.; a cellulose derivative such as ethyl cellulose, methyl cellulose, hydroxyethyl cellulose, carboxymethyl cellulose, etc.; and a resin having a melting point and/or glass transition temperature of 180° C. or more, such as polyphenylene ether, polysulfone, polyethersulfone, polyphenylene sulfide, polyetherimide, polyamideimide, polyamide, polyester, etc.

In the case of using polyvinyl alcohol (PVA) as the resin binder, the degree of saponification is preferably 85% or more and 100% or less, more preferably 90% or more and 100% or less, still more preferably 95% or more and 100% or less, yet still more preferably 99% or more and 100% or less. When the degree of saponification of PVA is 85% or more, it is likely that the temperature at which the separator is short-circuited (short temperature) is elevated and better safe performance is obtained.

In addition, the degree of polymerization of polyvinyl alcohol is preferably 200 or more and 5,000 or less, more preferably 300 or more and 4,000 or less, still more preferably 500 or more and 3,500 or less. When the degree of polymerization is 200 or more, it is likely that an inorganic filler such as calcined kaolin can be firmly bound to the inorganic layer with a small amount of polyvinyl alcohol and an increase in the air permeability of the substrate can be suppressed while maintaining the mechanical strength of the inorganic layer. Furthermore, when the degree of polymerization is 5,000 or less, it tends to be possible to prevent gelling, etc. at the time of preparing a coating solution.

The resin binder is preferably a resin latex binder. When a resin latex binder is used, it is likely that the ion permeability is hardly reduced and high output characteristics are easily obtained. Moreover, even in the event of a rapid temperature rise at the time of abnormal heat generation, it is likely that smooth shutdown characteristics are exhibited and a high degree of safety is easily obtained.

The resin latex binder is not particularly limited but, for example, from the viewpoint of enhancing the electrochemical stability and binding property, those obtained by emulsion-polymerizing an aliphatic conjugated diene-based monomer, an unsaturated carboxylic acid monomer, or an aliphatic conjugated diene-based monomer and/or an unsaturated carboxylic acid monomer and another monomer copolymerizable with the aliphatic conjugated diene-based monomer and/or unsaturated carboxylic acid monomer are preferred. The method of emulsion polymerization is not particularly limited, and conventional methods can be used. The method for adding the monomers and other components is not particularly limited, and any of a batch addition method, a split addition method, and a continuous addition method may be employed. In addition, any of one-step polymerization, two-step polymerization, multi-step polymerization, etc. may be employed.

The aliphatic conjugated diene-based monomer is not particularly limited but includes, for example, 1,3-butadiene, 2-methyl-1,3-butadiene, 2,3-dimethyl-1,3-butadiene, 2-chloro-1,3-butadiene, substituted linear conjugated pentadienes, and substituted side-chain conjugated hexadienes, etc. One of these may be used alone, or two or more thereof may be used in combination. Among these, 1,3-butadiene is preferred.

The unsaturated carboxylic acid monomer is not particularly limited but includes, for example, a mono- or dicarboxylic acid (anhydride) such as acrylic acid, methacrylic acid, crotonic acid, maleic acid, fumaric acid, itaconic acid, etc. One of these may be used alone, or two or more thereof may be used in combination. Among these, acrylic acid and methacrylic acid are preferred.

Another monomer copolymerizable with the aliphatic conjugated diene-based monomer and/or unsaturated carboxylic acid monomer is not particularly limited but includes, for example, an aromatic vinyl-based monomer, a vinyl cyanide-based monomer, an unsaturated carboxylic acid alkyl ester monomer, an unsaturated monomer containing a hydroxyalkyl group, and an unsaturated carboxylic acid amide monomer, etc. One of these may be used alone, or two or more thereof may be used in combination.

Among monomers described above, an unsaturated carboxylic acid alkyl ester monomer is preferred. The unsaturated carboxylic acid alkyl ester monomer is not particularly limited but includes, for example, methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate, etc. One of these may be used alone, or two or more thereof may be used in combination. Among these, methyl methacrylate is preferred.

Incidentally, in addition to these monomers, a monomer component other than those described above may also be used so as to improve various qualities and physical properties.

The average particle diameter of the resin binder is preferably from 50 to 800 nm, more preferably from 60 to 700 nm, still more preferably from 80 to 500 nm. When the average particle diameter of the resin binder is 50 nm or more, there is a tendency that the ion permeability is less likely to be reduced in the case of stacking the inorganic layer on at least one surface of the polyolefin microporous membrane and high output characteristics are easily obtained. In addition, even in the event of a rapid temperature rise at the time of abnormal heat generation, it is likely that smooth shutdown characteristics are exhibited and a high degree of safety is easily obtained. When the average particle diameter of the resin binder is 800 nm or less, good binding property tends to be developed to provide, in the case of forming a multilayer porous membrane, good thermal contraction and excellent safety. Incidentally, the average particle diameter of the resin binder can be controlled by adjusting the polymerization time, the polymerization temperature, the raw material composition ratio, the feeding sequence of raw materials, the pH, etc.

The thickness of the inorganic layer is preferably from 1 to 50 μm, more preferably from 1.5 to 20 μm, still more preferably from 2 to 10 μm, yet still more preferably from 3 to 10 μm, even yet still more preferably from 3 to 7 μm. When the thickness of the inorganic layer is 1 μm or more, the heat resistance and insulation of the substrate tend to be enhanced. In addition, when the thickness of the inorganic layer is 50 μm or less, the battery capacity and the permeability are likely to be more enhanced The layer density of the inorganic layer is preferably from 0.5 to 2.0 g/cm$^3$, more preferably from 0.7 to 1.5 g/cm$^3$. When the layer density of the inorganic layer is 0.5 g/cm$^3$ or more, the thermal contraction rate at high temperatures tends to be improved. In addition, when the layer density of the inorganic layer is 2.0 g/cm$^3$ or less, the air permeability is likely to be more reduced.

[Fine Pattern]

In the separator of the present embodiment, a pattern region having, as illustrated in FIG. 1, a plurality of convex parts 11*a*, i.e., a fine pattern 11, is formed on at least one main surface of the separator. The pattern may be formed over the entire main surface or may be formed in part of the main surface. In the present description, the "main surface" means a surface having at least three sides and a largest area among the surfaces of the porous film, or a surface opposing an electrode or a negative electrode when incorporated into a nonaqueous electrolyte battery. In view of achieving uniform Li ion diffusion, the pattern is preferably formed over the entire surface. If desired, a different pattern may be applied by dividing the inside of a plane. In addition, if desired, the pattern may be applied to the second surface, and the patterns of the first and second surfaces may be the same or different. From the production viewpoint, the pattern is preferably present only on the first surface. Hereinafter, in the description, for the sake of convenience, the convex part is referred to as “convex-shaped pattern”, and a plurality of convex parts is referred to as “fine pattern”.

In the fine pattern, all heights may be equalized, or a several kinds of heights may be mixed. More specifically, the height histogram may be multi-stepped or continuous. In order to make the distance between negative electrode and positive electrode more uniform and more strongly prevent displacement with respect to the separator, the positive electrode or the negative electrode, the pattern preferably has three kinds or less of heights, more preferably two kinds or less of heights, and it is still more preferred that all heights are equalized. However, from the production viewpoint, a variation thereof is permitted. The pattern height as used herein indicates the distance from a virtual flat surface formed in the lowest portion in the thickness direction of the separator to a substantially flat surface formed at an average position of the pattern top (sometimes referred to as a substantially flat surface formed at the top of a convex-shaped pattern) and denoted as T1.

In view of battery characteristic or safety of a nonaqueous electrolyte battery including the separator, the height (T1) of the fine pattern is preferably 50 μm or less, more preferably 45 μm or less, still more preferably 40 μm or less. Furthermore, in view of the amount of pushing, T1 is preferably 2 μm or more, or more than 2 μm, preferably 4 μm or more, still more preferably 6 μm or more.

In addition, the value of T1/T2 represented using the height (T1) of the fine pattern and the total thickness (T2) of the separator is 0.3 or more. When T1 satisfies this value (>0.3), in a separator roll, an electrode laminate or a roll obtained by winding an electrode laminate, the fine pattern can ensure a sufficient amount of pushing into the separator, the positive electrode or the negative electrode, so that the stability of a separator roll, an electrode laminate or a roll obtained by winding an electrode laminate can be more enhanced. The value of T1/T2 is more preferably more than 0.35, still more preferably 0.4 or more, or 0.45 or more. The upper limit thereof is less than 1. When T1/T2 is not more than the upper limit value above, reduction in the capacity density within the battery can be suppressed.

Denoting as L the length of the long axis of the pattern and as P the pattern pitch, the ratio L/P therebetween is preferably 0.01 or more and 0.90 or less. The lower limit thereof is more preferably 0.05 or more, still more preferably 0.10 or more. By providing this lower limit in L/P, the stress is easily concentrated on the convex part, and the stability of a separator roll, an electrode laminate, or a roll obtained by winding the electrode laminate can be enhanced. Also, the upper limit is more preferably 0.85 or less, still more preferably 0.80 or less. When the ratio above is not more than this upper limit, it is easy for the pressure to be uniformly applied to each convex-shaped pattern, and the stability of a separator roll, an electrode laminate, or a roll obtained by winding the electrode laminate can be enhanced.

In the fine pattern, the ratio of the area surrounded by bottom portions of the convex-shaped patterns to the area of a unit grid is preferably 0.80 or less. This ratio is more preferably 0.75 or less, still more preferably 0.70 or less. When the ratio is not more than the upper limit value above, the stress is easily concentrated on the convex part, and the stability of a separator roll, an electrode laminate, or a roll obtained by winding the electrode laminate can be enhanced. The ratio of the area surrounded by bottoms of the convex-shaped patterns of the fine pattern to the area of a unit grid is preferably 0.03 or more, more preferably 0.05 or more, still more preferably 0.10 or more. When the ratio is not less than the lower limit value above, it is easy for the pressure to be uniformly applied to each convex-shaped pattern, and the stability of a separator roll, an electrode laminate, or a roll obtained by winding the electrode laminate can be enhanced.

(Convex-Shaped Pattern)

The compressive modulus of the convex-shaped pattern in the present embodiment is preferably 2 times or more the lowest compressive modulus of the substrate. When the compressive modulus in the range above is satisfied, sufficient pushing into the convex part is possible and in the event of occurrence of sufficient deformation, the stability of a separator roll, an electrode laminate, or a roll obtained by winding the electrode laminate can be enhanced. The upper limit of the magnification is preferably 10,000 times or less, more preferably 7,500 times or less. In addition, the lower limit of the magnification is more preferably 5 times or more, still more preferably 10 times or more.

In the case of measuring the compressive modulus of the convex-shaped pattern, the convex-shaped pattern part may be taken out and measured by a microhardness tester. The measurement method follows the measurement of the substrate by means of a microhardness meter. Alternatively, in the case of being recognized as the same layer configuration as or an approximate layer configuration to other layers contained in the separator, the value thereof may be used as a substitute.

In the present embodiment, the air permeability of the convex-shaped pattern and the air permeability of the concave part are preferably 10 sec/100 ml or more and 1,000 sec/100 ml or less, more preferably 20 sec/100 ml or more and 900 sec/100 ml or less, still more preferably 30 sec/100 ml or more and 900 sec/100 ml or less. When the air permeability is 10 sec/100 ml or more, self-discharge tends to be more reduced at the time of using the separator in a nonaqueous electrolyte battery. In addition, when the air permeability is 1,000 sec/100 ml or less, better charge/discharge characteristics are likely to be obtained. The measurement of air permeability of the convex-shaped pattern follows the measurement of air permeability for the substrate.

The value of S1/S2 represented using the air permeability (S1) measured in the vertical direction of the convex-shaped pattern **11*a* illustrated in FIG. 1 and the air permeability (S2) of a non-convex-shaped pattern 11*b*** is preferably 5 or less. When S1/S2 satisfies this value (≤5), good charge/discharge characteristics tend to be obtained. The value of S1/S2 is more preferably 4.5 or less, still more preferably 4.0 or less. The lower limit thereof is not limited but is preferably 0.8 or more.

In the case where the average area (x) of convex-shaped patterns or the average area (y) of non-convex-shaped pattern parts is smaller than the airflow region of the air permeability tester, the average air permeability (Sa) of a region including both the convex-shaped pattern and the non-convex-shaped pattern part and the air permeability (S2) of the non-convex-shaped pattern part after physically separating the convex-shaped pattern are measured, and the air permeability (S1) of the convex-shaped pattern part can then be calculated according to the following formula 1:

$$S1=\{S2\cdot y-Sa\cdot(x+y)\}/x \quad \text{(formula 1)}$$

The convex-shaped pattern pitch is preferably more than 110 μm and 20,000 μm or less. The pattern pitch is more preferably 120 μm or more, still more preferably 130 μm or more. When the pattern pitch is not less than the lower limit above, the contact area of the convex shape is more reduced, and the stress is easily concentrated on the convex part, so that the stability of a separator roll, an electrode laminate, or a roll obtained by winding the electrode laminate can be enhanced. The upper limit of the pattern pitch is more preferably 15,000 μm or less, still more preferably 12,000 μm or less, yet still more preferably 10,000 μm or less. When the pattern pitch is not more than the upper limit above, it is easy for the pressure to be uniformly applied to each convex-shaped pattern, and the stability of a separator roll, an electrode laminate, or a roll obtained by winding the electrode laminate can be enhanced. The pattern pitch as used herein is specified by the center-center distance of a circle when the pattern is approximately contoured.

Figure 3:
FIG. 3 A schematic diagram illustrating a cone shape that is one example of the fine pattern on the first surface of the separator according to one embodiment of the present invention.

The surface of the fine pattern 11 is preferably, as illustrated in FIG. 2, a grid (e.g., square array, hexagonal array), a line-and-space structure, a random array, etc., and may include a plurality of these structures. From the viewpoint of preventing a stacking or winding deviation, a grid (e.g., square array, hexagonal array), a random array, etc. are more preferred. In addition, their cross-sectional concavo-convex shape may be a rectangular shape, a square shape, a trapezoidal shape, a rhombic shape, a hexagonal shape, a triangular shape, a circular shape, a shape having a curvature (for example, a cone shape illustrated in FIG. 3, a shape having three or more inflection points in the convex part illustrated in FIG. 4), etc. Furthermore, even if part of the pattern is chipped, in the case where on the production line scale, this can be judged as being attributable to chipping during production when viewed in a long cycle, the separator can be regarded as including a pattern. Also, with respect to a periodic missing, when it can be recognized as a combination of pattern variations, the separator can be regarded as including a pattern.

The length of the long axis of the convex-shaped pattern means a length of a longest line that can be drawn within an approximately contoured pattern including the sides of the pattern when the pattern is observed from a direction (basically a film thickness direction) perpendicular to the to-be-patterned surface of the separator, and is preferably a diameter of a circle including the pattern inside and having a minimum area, and more preferably, the pattern is in contact with at least two points of the circle. For example, in the case where the contour of the pattern is tetragonal, the length of the long axis of the pattern is a length of a longest side out of four sides. For example, in the case where the contour of the pattern is elliptic, the length of the long axis of the pattern is a diameter of a circle in contact with two points of the ellipse. For example, in the case where the contour of the pattern is pentagonal, the length of the long axis of the pattern is a diameter of a circle having a minimum area out of circles in contact with at least two points of the pentagon. In the case of a pattern having periodicity only in the one-dimensional direction, such as line-and-space, the length of the long axis of the pattern is expressed as a period between patterns.

The length of the long axis of the convex-shaped pattern in the fine pattern 11 illustrated in FIG. 1 is preferably more than 100 μm and 500,000 μm or less. The lower limit thereof is more preferably 110 μm or more, still more preferably 120 μm or more. By providing this lower limit, collapse of the pattern due to pushing can be prevented. The upper limit is more preferably 400,000 μm or less, still more preferably 300,000 μm or less. By providing this upper limit in the length of the long axis of the pattern, the pressure is concentrated on the convex-shaped pattern, and displacement of a separator roll, an electrode laminate or a roll obtained by winding an electrode laminate is prevented, as a result, the stability is enhanced. The length of the short axis of the pattern is not particularly limited as long as it is shorter than the length of the long axis of the pattern.

The numerical value Rp/rp represented using the diameter (Rp) of a circumscribed circle in contact with at least two points on the outline of the pattern and the diameter (rp) of an inscribed circle in contact with at least two points on the outline of the pattern is preferably 1 or more and less than 10. Within the range of $1 \leq Rp/rp < 10$, the stress is easily concentrated on the convex part of the separator, and the stability of a separator roll, an electrode laminate or a roll obtained by winding an electrode laminate can be enhanced. Rp/rp is more preferably 1 or more and less than 9, still more preferably 1 or more and less than 8.

The inside of the pattern is preferably porous. When it is porous, better charge/discharge characteristics are likely to be obtained.

(Composition of Fine Pattern)

In order to make the inside of the pattern porous, it is preferable to incorporate inorganic particles or organic particles such as resin fine particle. The pattern composition includes, for example, those containing inorganic particles or organic particles such as resin fine particle, and a resin binder. In addition, the pattern may contain additives such as dispersant and thickener, if desired.

(Inorganic Particle)

The inorganic particle contained in the pattern is preferably selected from the group consisting of sodium oxide, potassium oxide, magnesium oxide, calcium oxide, barium oxide, lanthanum oxide, cerium oxide, strontium oxide, vanadium oxide, $SiO_2$—MgO (magnesium silicate), $SiO_2$—CaO (calcium silicate), hydrotalcite, sodium carbonate, potassium carbonate, magnesium carbonate, calcium carbonate, barium carbonate, lanthanum carbonate, cerium carbonate, basic titanate, basic silicotitanate, basic copper acetate, basic lead sulfate; an anion adsorbent such as a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, zirconium oxide, etc.; a cation adsorbent such as zirconium phosphate, titanium phosphate, apatite, non-basic titanate, niobate, niobate titanate, etc.; zeolite, a carbonate and a sulfate, such as calcium sulfate, magnesium sulfate, aluminum sulfate, gypsum, barium sulfate, etc.; oxide-based ceramics such as alumina trihydrate (ATH), fumed silica, precipitated silica, zirconia, yttria, etc.; nitride-based ceramics such as silicon nitride, titanium nitride, boron nitride, etc.; a layered silicate such as silicon carbide, talc, dickite, nacrite, halloysite, pyrophyllite, montmorillonite, sericite, amesite, bentonite, etc.; asbestos, diatomite, glass fiber, a synthetic layered silicate such as mica or fluoromica, and zinc borate. These may be used individually, or a plurality thereof may be used in combination.

(Resin Fine Particle)

The resin fine particle contained in the pattern is preferably composed of an electrochemically stable resin having heat resistance and electrical insulation and being stable to a nonaqueous electrolyte in the battery and resistant to oxidation and reduction in the battery operating voltage range. Examples of the resin for forming such resin fine particles include a crosslinked body of at least one resin selected from the group consisting of a styrene resin (e.g., polystyrene), a styrene butadiene rubber, an acrylic resin (e.g., polymethyl methacrylate), a polyalkylene oxide (e.g., polyethylene oxide), a fluororesin (e.g., polyvinylidene fluoride) and derivatives thereof, a urea resin, a polyurethane, etc. For the resin fine particle, one of the resins exemplified above may be used alone, or two or more thereof may be used in combination. In addition, the resin fine particle may contain, if desired, known additives that can be added to a resin, for example, such as antioxidant, etc.

(Resin Binder)

The resin binder contained in the pattern is not particularly limited, but it is preferable to use those insoluble in an electrolytic solution of a lithium ion secondary battery and electrochemically stable in the use range of the lithium ion secondary battery. Such a resin binder is not particularly limited but includes, for example, a polyolefin such as polyethylene, polypropylene, etc.; a fluorine-containing resin such as polyvinylidene fluoride, polytetrafluoroethylene, etc.; a fluorine-containing rubber such as a vinylidene fluoride-hexafluoropropylene-tetrafluoroethylene copolymer, an ethylene-tetrafluoroethylene copolymer, etc.; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, polyvinyl acetate, etc.; a cellulose derivative such as ethyl cellulose, methyl cellulose, hydroxyethyl cellulose, carboxymethyl cellulose, etc.; and a resin having a melting point and/or a glass transition temperature of 180° C. or more, such as polyphenylene ether, polysulfone, polyethersulfone, polyphenylene sulfide, polyetherimide, polyamideimide, polyamide, polyester, etc.

In the case of using polyvinyl alcohol (PVA) as the resin binder, the degree of saponification is preferably 85% or more and 100% or less, more preferably 90% or more and 100% or less, still more preferably 95% or more and 100% or less, yet still more preferably 99% or more and 100% or less. When the degree of saponification of PVA is 85% or more, it is likely that the temperature at which the separator is short-circuited (short temperature) is elevated and better safe performance is obtained.

In addition, the degree of polymerization of polyvinyl alcohol is preferably 200 or more and 5,000 or less, more preferably 300 or more and 4,000 or less, still more preferably 500 or more and 3,500 or less. When the degree of polymerization is 200 or more, it is likely that an inorganic filler such as calcined kaolin can be firmly bound to the inorganic layer with a small amount of polyvinyl alcohol and an increase in the air permeability of the substrate can be suppressed while maintaining the mechanical strength of the inorganic layer. Furthermore, when the degree of polymerization is 5,000 or less, it tends to be possible to prevent gelling, etc. at the time of preparing a coating solution.

The resin binder is preferably a resin latex binder. Use of a resin latex binder makes it difficult for the ion permeability to decrease and facilitates obtaining high output characteristics. In addition, even in the event of a rapid temperature rise at the time of abnormal heat generation, it is likely that smooth shutdown characteristics are exhibited and a high degree of safety is easily obtained.

The resin latex binder is not particularly limited, but, for example, from the viewpoint of enhancing the electrochemical stability and binding property, those obtained by emulsion-polymerizing an aliphatic conjugated diene-based monomer, an unsaturated carboxylic acid monomer, or an aliphatic conjugated diene-based monomer and/or an unsaturated carboxylic acid monomer and another monomer copolymerizable with the aliphatic conjugated diene-based monomer and/or unsaturated carboxylic acid monomer are preferred. The method of emulsion polymerization is not particularly limited, and conventional methods can be used. The method for adding the monomers and other components is not particularly limited, and any of a batch addition method, a split addition method, and a continuous addition method may be employed. In addition, any of one-step polymerization, two-step polymerization, multi-step polymerization, etc. may be employed.

The aliphatic conjugated diene-based monomer is not particularly limited but includes, for example, 1,3-butadiene, 2-methyl-1,3-butadiene, 2,3-dimethyl-1,3-butadiene, 2-chloro-1,3-butadiene, substituted linear conjugated pentadienes, and substituted side-chain conjugated hexadienes, etc. One of these may be used alone, or two or more thereof may be used in combination. Among these, 1,3-butadiene is preferred.

The unsaturated carboxylic acid monomer is not particularly limited but includes, for example, a mono- or dicarboxylic acid (anhydride) such as acrylic acid, methacrylic acid, crotonic acid, maleic acid, fumaric acid, itaconic acid, etc. One of these may be used alone, or two or more thereof may be used in combination. Among these, acrylic acid and methacrylic acid are preferred.

Another monomer copolymerizable with the aliphatic conjugated diene-based monomer and/or unsaturated carboxylic acid monomer is not particularly limited but includes, for example, an aromatic vinyl-based monomer, a vinyl cyanide-based monomer, an unsaturated carboxylic acid alkyl ester monomer, an unsaturated monomer containing a hydroxyalkyl group, and an unsaturated carboxylic acid amide monomer, etc. One of these may be used alone, or two or more thereof may be used in combination.

Among monomers described above, an unsaturated carboxylic acid alkyl ester monomer is preferred. The unsaturated carboxylic acid alkyl ester monomer is not particularly limited but includes, for example, methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate, etc. One of these may be used alone, or two or more thereof may be used in combination. Among these, methyl methacrylate is preferred.

Incidentally, in addition to these monomers, a monomer component other than those described above may also be used so as to improve various qualities and physical properties.

The average particle diameter of the resin binder is preferably from 50 to 800 nm, more preferably from 60 to 700 nm, still more preferably from 80 to 500 nm. When the average particle diameter of the resin binder is 50 nm or more, there is a tendency that the ion permeability is less likely to be reduced in the case of stacking the pattern on at least one surface of the polyolefin microporous membrane and high output characteristics are easily obtained. In addition, even in the event of a rapid temperature rise at the time of abnormal heat generation, it is likely that smooth shutdown characteristics are exhibited and a high degree of safety is easily obtained. When the average particle diameter of the resin binder is 800 nm or less, good binding property tends to be developed to provide, in the case of a multilayer porous membrane, good thermal contraction and excellent safety. Incidentally, the average particle diameter of the resin binder can be controlled by adjusting the polymerization time, the polymerization temperature, the raw material composition ratio, the feeding sequence of raw materials, the pH, etc.

The aqueous dispersant for forming the pattern includes, for example, a cationic surfactant such as organosiloxane polymer KP 341 (produced by Shin-Etsu Chemical Co., Ltd.), (meth)acrylic acid-based (co) polymer Polyflow No. 75, No. 90, No. 95 (produced by Kyoeisha Chemical Co., Ltd.), W001 (Yusho Co., Ltd.), etc.; a nonionic surfactant such as polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid ester, etc.; an anion surfactant such as W004, W005, W017 (produced by Yusho Co., Ltd.), etc.; a polymer dispersant such as EFKA-46, EFKA-47, EFKA-47EA, EFKA Polymer 100, EFKA Polymer 400, EFKA Polymer 401, EFKA Polymer 450 (all produced by Ciba Specialty Chemicals Inc.), Disperse Aid 6, Disperse Aid 8, Disperse Aid 15, Disperse Aid 9100, SN Dispersant 5040, 5033, 5034, 5468, 5020 (all produced by SAN NOPCO Ltd.), and various Solsperse dispersants, e.g., Solsperse 3000, 5000, 9000, 12000, 13240, 13940, 17000, 24000, 26000, 28000, 41000 (produced by Lubrizol Corporation), etc.; a dispersant such as ADEKA PLURONIC L31, F38, L42, L44, L61, L64, F68, L72, P95, F77, P84, F87, P94, L101, P103, F108, L121, P-123 (produced by ADEKA Corporation), IONET S-20 (produced by Sanyo Chemical Industries, Ltd.), DISPERBYK 101, 103, 106, 108, 109, 110, 111, 112, 116, 118, 130, 140, 142, 162, 163, 164, 166, 167, 170, 171, 174, 176, 180, 182, 184, 190, 191, 194 N, 2000, 2001, 2010, 2015, 2050, 2055, 2150, 2152, 2155, 2164 (produced by BYK-Chemie GmbH), etc.; a dispersant such as DEMOL EP, Poiz 520, Poiz 521, Poiz 530, Poiz 535, DEMOL P (produced by Kao Corporation), etc.; and various polycarboxylic acid-based dispersants such as Aron T-50, A-6012, A-6017, AT-40H, A-6001, A-30SL, A-6114, A-210, SD-10, A-6712, A-6330, CMA-101, JURYMER (registered trademark) AC-10NPD (all produced by Toagosei Co., Ltd.), Nuosperse FX-605, FX-609, FX-600, FX-504 (produced by Elementis), etc. In addition, other than those described above, the dispersant includes an oligomer or polymer having a polar group at the molecular end or in the side chain, such as acrylic copolymer, etc. As for the dispersant, one type may be used alone, or two or more types may be used in combination.

The aqueous thickener for forming the pattern includes, for example, SEPIGEL 305, NS, EG, FL, SEPIPLUS 265, S, 400, SEPINOV EMT10, P88, SEPIMAX ZEN (produced by Seiwa Kasei Co., Ltd.), Aron A-10H, A-20P-X, A-20L, A-30, A-7075, A-7100, A-7185, A-7195, A-7255, B-300K, B-500K, JURYMER (registered trademark) AC-10LHPK, AC-10SHP, RHEOGIC 260H, 845H, JUNLON PW-120 (produced by Toagosei Co., Ltd.), DISPERBYK 410, 411, 415, 420, 425, 428, 430, 431, 7410ET, 7411ES, 7420ES, OPTIFLO-L1400 (produced by BYK-Chemie GmbH), Cosquat GA468 (produced by Osaka Organic Chemical Industry Ltd.), a cellulose derivative-derivative material (e.g., carboxymethylcellulose, methylcellulose, hydroxycellulose), a protein-based material (e.g., casein, sodium caseinate, ammonium caseinate), an alginic acid-based material (e.g., sodium alginate), a polyvinyl-based material (e.g., polyvinyl alcohol, polyvinylpyrrolidone, a polyvinyl benzyl ether copolymer), a polyacrylic acid-based material (e.g., sodium polyacrylate, a polyacrylic acid-(meth)acrylic acid copolymer), a polyether-based material (e.g., Pluronic polyether, polyether dialkyl ester, polyether dialkyl ether, a polyether urethane-modified product, a polyether epoxy-modified product), and a maleic anhydride copolymer-based material (e.g., a partial ester of a vinyl ether-maleic anhydride copolymer, a half ester of drying oil fatty acid allyl alcohol ester-maleic anhydride). Other than those described above, the thickener includes a polysaccharide such as polyamide wax salt, acetylene glycol, xanthan gum, diutan gum, zentan gum, etc., and an oligomer or polymer having a polar group at the molecular end or in the side chain. As for the thickener, one type may be used alone, or two or more types may be used in combination.

(Shape of Particle and Structure Composed of Particles)

The shape of the inorganic particle or resin fine particle may be any of plate-like, scale-like, acicular, columnar, spherical, polyhedral and massive shapes, etc. As for the inorganic particle or resin fine particle having the above-described shape, one type may be used alone, two or more types may be used in combination. From the viewpoint of pushing the inorganic particle or resin fine particle into the separator, a polyhedral shape composed of faces is preferred. In particular, when a separator is fabricated, it is preferable to satisfy the following relational expression:

That is, in a cross-section of the inorganic particle or resin fine particle, including a vertical line of the separator, the numerical value Ri/ri represented using the diameter (Ri) of a circumscribed circle in contact with at least two points on the outline of the inorganic particle or resin fine particle and the diameter (ri) of an inscribed circle in contact with at least two points on the outline of the inorganic particle or resin fine particle is preferably more than 1 and less than 10. When Ri/ri is more than 1, it is easy for the pressure to be uniformly applied to each convex-shaped pattern, and the stability of a separator roll, an electrode laminate, or a roll obtained by winding the electrode laminate can be enhanced. The lower limit thereof is more preferably 1.5 or more, still more preferably 2.0 or more. The upper limit is more preferably less than 9, still more preferably less than 8. By adjusting Ri/ri to be not more than the upper limit above, the inorganic particle can be prevented from cracking due to pushing.

In addition, as for the particle diameter of the inorganic particle or resin fine particle, the average particle diameter (D50) is preferably from 0.1 to 4.0 μm, more preferably from 0.2 to 3.5 μm, still more preferably from 0.4 to 3.0 μm. By adjusting the average particle diameter to such a range, thermal contraction at high temperatures tends to be further suppressed.

The content of the inorganic particles or resin fine particles is, per 100 weight % of the particle-containing layer constituting the pattern, preferably 50 weight % or more and less than 100 weight %, more preferably 70 weight % or more and 99.99 weight % or less, still more preferably 80 weight % or more and 99.9 weight % or less, yet still more preferably 90 weight % or more and 99 weight % or less. When the content of the inorganic particles or resin fine particles is in the range above, the binding property of the inorganic particle or resin fine particle and the transparency, heat resistance, etc. of the multilayer porous membrane tend to be more enhanced.

The density of the fine pattern is preferably from 0.5 to 2.0 $g/cm^3$, more preferably from 0.7 to 1.5 $g/cm^3$. When the density of the fine pattern is 0.5 $g/cm^3$ or more, the thermal contraction rate at high temperatures tends to be improved. In addition, when the density of the fine pattern is 2.0 $g/cm^3$ or less, the air permeability is likely to be more reduced.

The particle constituting the pattern is preferably an inorganic particle. When an inorganic particle is used, the particle can increase the deformation amount, and the stability of a separator roll, an electrode laminate, or a roll obtained by winding the electrode laminate can be enhanced.

(Other Physical Properties of Separator)

The porosity of the separator used for a nonaqueous electrolyte battery according to the present embodiment is, in the state of the separator being dry, preferably 30% or more, more preferably 40% or more, so as to ensure the holding amount of a nonaqueous electrolyte and thereby improve the ion permeability. On the other hand, from the viewpoint of ensuring the strength of the separator and preventing internal short circuit, the porosity of the separator is, in the state of the separator being dry, preferably 80% or less, more preferably 70% or less. Incidentally, the porosity Po (%) of the separator can be calculated from the separator thickness including the height of the concave- or convex-shaped pattern described above, the mass per area, and the density of a constituent component by determining the sum total for each component i according to the following formula:

$$Po=\{1-(m/t)/(\Sigma a_i \cdot \rho i)\}\times 100$$

{wherein, $a_i$ is the ratio of a component i assuming the mass of the entirety is 1, $\rho_i$ is the density ($g/cm^3$) of a component i, m is the mass per unit area ($g/cm^2$) of the separator, and t is the thickness (cm) of the separator}.

The total thickness (T2) of the separator in the present embodiment is, in both a single-layer structure and a multilayer structure, including the height of the above-described convex-shaped pattern, preferably 5 μm or more and 200 μm or less, more preferably 6 μm or more and 100 μm or less, still more preferably 7 μm or more and 50 μm or less. When the thickness of the separator is 5 μm or more, the mechanical strength of the separator tends to be more enhanced. In addition, when the thickness of the separator is 200 μm or less, the occupied volume of the separator within a battery decreases, and this leads to a tendency to more increase the capacity of a nonaqueous electrolyte battery and more enhance the ion permeability.

The air permeability of the separator in the present embodiment is preferably 10 sec/100 ml or more and 500 sec/100 ml or less, more preferably 20 sec/100 ml or more and 450 sec/100 ml or less, still more preferably 30 sec/100 ml or more and 450 sec/100 ml or less. When the air permeability is 10 sec/100 ml or more, self-discharge tends to be more reduced at the time of using the separator in a nonaqueous electrolyte battery. In addition, when the air permeability is 500 sec/100 ml or less, better charge/discharge characteristics are likely to be obtained.

[Adhesive Layer]

The separator of the present embodiment may further has an adhesive layer, if desired. The adhesive layer contains a thermoplastic polymer. The position of the adhesive layer in the separator is not particularly limited as long as it is formed on the surface of the separator. For example, it includes a configuration where the adhesive layer is disposed on at least one surface of a separator having a fine pattern on at least one surface of the above-described polyolefin microporous membrane, and a configuration where the adhesive layer is additionally disposed on at least one surface of a separator in which an inorganic layer is disposed on at least one surface of the polyolefin microporous membrane and a fine pattern is further disposed on at least one surface. However, the adhesive layer is preferably formed on a surface opposite the surface having a fine pattern, and in this case, the contact area of the fine pattern with the adhesive layer can be reduced, so that the blocking property can be increased and/or manufacturing defects can be decreased. The sea-island structure of the adhesive layer is also not particularly limited, but the structure preferably has a different pattern from the fine pattern. By employing a different pattern, the blocking property can further be increased.

On at least one surface of the separator, the adhesive layer may be disposed over the entire surface or may be partially disposed. In the adhesive layer, a portion containing a thermoplastic polymer and a portion containing no thermoplastic polymer may be present like sea-islands.

(Thermoplastic Polymer)

The thermoplastic polymer used in the present embodiment is not particularly limited but includes, for example, a polyolefin such as polyethylene, polypropylene, a-polyolefin, etc.; a fluorine-containing resin such as polyvinylidene fluoride, polytetrafluoroethylene, etc. and a copolymer containing these; a diene-based polymer containing, as a monomer unit, a conjugated diene such as butadiene, isoprene, etc., a copolymer containing these, and a hydride thereof; an acrylic polymer containing, as a monomer unit, an acrylic acid ester, a methacrylic acid ester, etc. a copolymer containing these, and a hydride thereof; rubbers such as ethylene propylene rubber, polyvinyl alcohol, polyvinyl acetate, etc.; a cellulose derivative such as ethyl cellulose, methyl cellulose, hydroxyethyl cellulose, carboxymethyl cellulose, etc.; and a resin having a melting point and/or glass transition temperature of 180° C. or more, such as polyphenylene ether, polysulfone, polyethersulfone, polyphenylene sulfide, polyetherimide, polyamideimide, polyamide, polyester, etc., and a mixture thereof, etc. In addition, as a monomer used when synthesizing the thermoplastic polymer, a monomer having a hydroxyl group, a sulfonic acid group, a carboxyl group, an amide group, or a cyano group may also be used.

Among these thermoplastic polymers, a diene-based polymer, an acrylic polymer, and a fluorine-based polymer are preferred, because they are excellent in the binding property to an electrode active material and the strength or flexibility.

(Amount of Thermoplastic Polymer)

The amount of the thermoplastic polymer is, per area of the substrate, preferably 0.05 $g/m^2$ or more and 2.0 $g/m^2$ or less, more preferably 0.07 $g/m^2$ or more and 1.5 $g/m^2$ or less, still more preferably 0.1 $g/m^2$ or more and 1.0 $g/m^2$ or less. When the amount of the thermoplastic polymer is in the range above, it is likely that while the adhesive strength to the substrate and the electrode, etc. is enhanced, clogging of pores of the substrate can be suppressed and reduction in the cycle characteristics can be more successfully prevented. The amount of the thermoplastic polymer can be adjusted by changing the polymer concentration of a liquid applied or the coating amount of the polymer solution.

(Thickness of Adhesive Layer)

The average thickness of the adhesive layer is preferably 2.0 μm or less, more preferably 1.5 μm or less, still more preferably 1.0 μm or less, per one surface of the separator. When the average thickness of the adhesive layer is 2.0 μm or less, the permeability reduction attributable to the thermoplastic polymer and sticking of the thermoplastic polymers to one another or between the thermoplastic polymer and the substrate tend to be more successfully suppressed. Incidentally, the average thickness of the adhesive layer can be adjusted by changing the polymer concentration of a liquid applied or the coating amount, coating method, coating conditions, etc. of the polymer solution.

(Area Percentage of Substrate Coated with Adhesive Layer)

The area percentage (%) of the substrate coated with the adhesive layer is preferably 95% or less, more preferably 70% or less, still more preferably 50% or less, per a total area of 100% of the substrate. In addition, the area percentage (%) of the substrate coated with the adhesive layer is preferably 5% or more. When the area percentage is 95% or less, clogging of pores of the substrate by the thermoplastic polymer tends to be more successfully suppressed to enable more enhancement of the permeability. Also, when the area percentage is 5% or more, the adhesion is likely to be more enhanced. Incidentally, the area percentage can be adjusted by changing the thermoplastic polymer concentration of the coating liquid or the coating amount, coating method, coating conditions, etc. of the coating liquid.

[Production Method of Separator]

(Production Method of Substrate)

The method for producing the substrate is not particularly limited but, for example, a known production method can be employed. The known production method includes, for example, a method where a composition containing a polyolefin resin, etc. (hereinafter, sometimes referred to as "resin composition") and a plasticizer are melt-kneaded and molded into a sheet shape, the sheet is stretched depending on the case, and the plasticizer is extracted to form pores; a method where a resin composition is melt-kneaded and extruded at a high draw ratio and then, the resin crystal interface is separated by heat treatment and stretching to form pores; a method where a resin composition and an inorganic filler are melt-kneaded and molded into a sheet shape and then, the interface between the resin and the inorganic filler is separated by stretching to form pores; and a method where a resin composition is dissolved and then, the solution is immersed in a poor solvent for the resin to solidify the resin and at the same time remove the solvent to thereby form pores. Hereinafter, the thus-obtained molded body of the resin composition is sometimes referred to as "porous membrane".

(Method for Forming Inorganic Layer)

In the case where the substrate has an inorganic layer, the method for forming the inorganic layer is not particularly limited but includes, for example, a method where a coating solution containing an inorganic filler and a resin binder is applied to at least one surface of the porous membrane to form an inorganic layer.

The method for dispersing an inorganic filler and a resin binder in a solvent of the coating solution is not particularly limited but includes, for example, mechanical agitation using a ball mill, a bead mill, a planetary ball mill, a vibration ball mill, a sand mill, a colloid mill, an attritor, a roll mill, a high-speed impeller dispersion, a disperser, a homogenizer, a high-speed impact mill, an ultrasonic dispersion, a stirring blade, etc.

The method for applying the coating solution to the substrate is not particularly limited but includes, for example, a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, a spray coating method, etc.

The method for removing the solvent from the coated film after coating is not particularly limited as long as it does not adversely affect the porous membrane, and includes, for example, a method where the porous membrane is dried at a temperature not more than the melting point while anchoring it, and a method where the porous membrane is dried under reduced pressure at a low temperature. From the viewpoint of controlling the contraction stress in the MD direction of the porous membrane, it is preferable to appropriately adjust the drying temperature, the winding tension, etc.

(Method for Forming Fine Pattern Layer)

The method for forming a fine pattern layer is not particularly limited but includes, for example, a method where a coating solution containing an inorganic filler and a resin binder is partially applied on at least one surface of the substrate to form an inorganic layer having a fine pattern.

The method for dispersing an inorganic filler and a resin binder in a solvent of the coating solution is not particularly limited but includes, for example, mechanical agitation using a ball mill, a bead mill, a planetary ball mill, a vibration ball mill, a sand mill, a colloid mill, an attritor, a roll mill, a high-speed impeller dispersion, a disperser, a homogenizer, a high-speed impact mill, an ultrasonic dispersion, a stirring blade, etc.

The method for partially applying the coating solution to the substrate is not particularly limited but includes, for example, a gravure coater method, a small-diameter gravure coater method, a reverse roll coater method, a transfer roll coater method, a kiss coater method, a die coater method, a screen printing method, a spray coating method, a transfer method, etc. More specifically, the fine pattern can be formed by applying the coating solution to a substrate by means of a roll and drying the coating.

In the case of providing the fine pattern layer on the same surface as the inorganic layer of the substrate, the same composition as that of the inorganic layer of the substrate may be applied to effect simultaneous film formation. That is, a continuous layer of the inorganic layer and the fine pattern may be produced at the same time. By effecting simultaneous film formation, the inorganic layer and the fine pattern layer become continuous with each other, and this advantageously facilitates maintaining the strength.

(Method for Forming Adhesive Layer)

The method for forming the adhesive layer on the substrate is not particularly limited and includes, for example, a method where a coating solution containing a thermoplastic polymer is applied to the substrate.

The method for applying the coating solution containing a thermoplastic polymer to the substrate is not particularly limited but includes, for example, a gravure coater method, a small-diameter gravure coater method, a reverse roll coater method, a transfer roll coater method, a kiss coater method, a die coater method, a screen printing method, a spray coating method, etc. The adhesive layer may be a continuous layer or may have a sea-island structure and in this case, more specifically, the coating solution may be applied to the separator by means of a roll and dried to form an adhesive layer of sea-islands.

In the case of applying the thermoplastic polymer, if the coating solution penetrates the inside of the microporous membrane, the adhesive resin fills the surface and inside of a pore, and the permeability is reduced. Therefore, the medium of the coating solution is preferably a poor solvent for the thermoplastic polymer. In the case where a poor solvent for the thermoplastic polymer is used as the medium of the coating solution, this is preferable from the viewpoint of suppressing reduction in the permeability, because the coating liquid does not penetrate the inside of the microporous membrane and the adhesive polymer is present mainly on the surface of the microporous membrane. Such a medium is preferably water. The medium usable in combination with water is not particularly limited but includes ethanol, methanol, etc.

Furthermore, when the substrate is subjected to a surface treatment in advance of coating, the coating solution is easily applied, and the adhesion between the substrate and the adhesive polymer is advantageously enhanced. The method for the surface treatment is not particularly limited as long as it is a method not significantly impairing the porous structure of the substrate, and includes, for example, a corona discharge treatment method, a plasma treatment method, a mechanical roughening method, a solvent treatment method, an acid treatment method, an ultraviolet oxidation method, etc.

The method for removing the solvent from the coated film after coating is not particularly limited as long as it does not adversely affect the substrate. The method includes, for example, a method where the coated film is dried at a temperature not more than the melting point of the substrate while anchoring the substrate, a method where the coated film is dried under reduced pressure at a low temperature, and a method where the coated film is immersed in a poor solvent for the adhesive polymer to solidify the adhesive polymer and at the same time, extract the solvent.

[Production Method of Roll]

A roll can be produced by winding the separator obtained as above.

Second Embodiment: Roll

The roll according to the second embodiment of the present invention is a roll obtained by winding a separator, wherein the separator has convex-shaped patterns on at least one surface of the separator, the compressive modulus of the pattern is 2 times or more the compressive modulus of a layer having a lowest compressive modulus out of a single layer or a plurality of layers constituting the substrate, the value of T1/T2 represented using the distance (T1) between a substantially flat surface formed at the top of the pattern and a substantially flat surface formed at the bottom of the pattern and the total thickness (T2) of the separator is 0.1 or more, and S1/S2 represented using a ratio of the air permeability S1 of a portion having the pattern, measured in the vertical direction of the pattern, to the air permeability S2 of a non-pattern part is 5 or less.

In the roll according to the second embodiment, the embodiments except for the following embodiments may be the same as those in the first embodiment.

The lower limit value of T1/T2 is preferably more than 0.12, more preferably 0.3 or more.

The diameter of the tube or core around which the separator is wound may be a diameter used as a product and is not particularly limited but is preferably 2 inches or more, more preferably 3 inches or more, still more preferably 6 inches or more. In view of productivity of the roll, the diameter of the tube may be 10 inches or less.

The material of the tube or core around which the separator is wound is not particularly limited. The material may include any of paper, ABS resin, polyethylene resin, polypropylene resin, polystyrene resin, polyester resin, and vinyl chloride resin. Among others, the material is preferably a resin and may include any of ABS resin polyethylene resin, polypropylene resin, polystyrene resin, polyester resin, and vinyl chloride resin.

The separator winding length is not particularly limited but in view of productivity when manufacturing a battery, is preferably 100 m or more, more preferably 300 m or more, still more preferably 500 m or more. In view of productivity of the roll, the separator winding length may be 5,000 m or less.

Third Embodiment: Configuration, Form and Use of Nonaqueous Electrolyte Battery In the nonaqueous electrolyte battery according to the third embodiment of the present invention, a positive electrode and a negative electrode can be used in the form of an electrode laminate by stacking the electrodes through a separator, or the form of an electrode roll obtained by further winding the electrode laminate.

The form of the nonaqueous electrolyte battery according to the present embodiment includes a cylindrical form (e.g. square cylinder, round cylinder) using, as the exterior can, a steel can, an aluminum can, etc. Also, the nonaqueous electrolyte battery according to the present embodiment may be formed using, as the outer package, a laminate film obtained by vapor-depositing a metal.

In the case where the nonaqueous electrolyte battery according to the present embodiment is a lithium ion secondary battery, an electrode laminate having stacked therein, in order, a positive electrode, a fine pattern, a separator, and a negative electrode; or a positive electrode, a separator, a fine pattern, and a negative electrode, or an electrode roll thereof, and a nonaqueous electrolyte are preferably included in the lithium ion secondary battery. It is more preferred that an electrode laminate having stacked therein, in order, a positive electrode, a separator, a fine pattern, and a negative electrode, or an electrode roll thereof, and a nonaqueous electrolyte are included in the lithium ion secondary battery. When a plurality of constituent elements of the lithium ion secondary battery are arranged in such an order, movement of lithium ions within the battery is ensured, and the stability of an electrode laminate, or an electrode roll thereof, affecting the life characteristics or safety of the battery, is enhanced.

[Positive Electrode]

The positive electrode preferably contains a positive electrode active material, a conductive material, a binder, and a current collector.

As the positive electrode active material that can be contained in the positive electrode, known ones capable of electrochemically storing and releasing lithium ions can be used. Among these, a material containing lithium is preferred as the positive electrode active material. The positive electrode active material includes, for example, an oxide represented by the following formula (1):

[Chem. 1]

$$Li_xMn_{2-y}M_yO_z \quad (1)$$

{wherein M represents at least one element selected from the group consisting of transition metal elements, $0<x\leq1.3$, $0.2<y<0.8$, and $3.5<z<4.5$};

a layered oxide represented by the following formula (2):

[Chem. 2]

$$Li_xM_yO_z \quad (2)$$

{wherein M represents at least one element selected from the group consisting of transition metal elements, $0<x\leq1.3$, $0.8<y<1.2$, and $1.8<z<2.2$};

a spinel type oxide represented by the following formula (3):

[Chem. 3]

$$LiMn_{2-x}Mn_xO_4 \quad (3)$$

{wherein Ma represents at least one element selected from the group consisting of transition metal elements, and $0.2 \le x \le 0.7$};

a Li-excess layered oxide positive electrode active material which is a composite oxide of an oxide represented by the following formula (4):

[Chem. 4]

$$Li_2McO_3 \quad (4)$$

{wherein Mc represents at least one element selected from the group consisting of transition metal elements} and an oxide represented by the following formula (5):

[Chem. 5]

$$LiMdO_5 \quad (5)$$

{wherein Md represents at least one element selected from the group consisting of transition metal elements}, and is represented by the following formula (6):

[Chem. 6]

$$zLi_2McO_3-(1-z)LiMdO_2 \quad (6)$$

{wherein Mc and Md have respectively the same meanings as Mc and Md in formulae (4) and (5), and $0.1 \le z \le 0.9$};

an olivine type positive electrode active material represented by the following formula (7):

[Chem. 7]

$$LiMb_{1-y}Fe_yPO_4 \quad (7)$$

{wherein Mb represents at least one element selected from the group consisting of Mn and Co, and $0 \le y \le 1.0$}; and a compound represented by the following formula (8):

[Chem. 8]

$$Li_2MePO_4F \quad (8)$$

{wherein Me represents at least one element selected from the group consisting of transition metal elements}. One of these positive electrode active materials may be used alone, or two or more thereof may be used in combination.

Incidentally, for forming the positive electrode used in the present embodiment, a conductive material, a binder, and a current collector known in the art may be used.

In addition, in the positive electrode mixture layer of the positive electrode, it is preferable to adjust the content of the positive electrode active material to be from 87 weight % to 99 weight %, adjust the content of the conductive aid to be from 0.5 weight % to 10 weight %, and/or adjust the content of the binder to be from 0.5 weight % to 10 weight %.

[Negative Electrode]

The negative electrode used in the present embodiment preferably contains a negative electrode active material, a binder, and a current collector.

As the negative electrode active material that can be contained in the negative electrode, a known material capable of electrochemically storing and releasing lithium ions may be used. Such a negative electrode active material is not particularly limited, but, for example, a carbon material such as graphite powder, mesophase carbon fiber and mesophase microsphere; and a metal, an alloy, an oxide, and a nitride, are preferred. One of these may be used alone, or two or more thereof may be used in combination.

As the binder that can be contained in the negative electrode, a known material capable of binding at least two members out of a negative electrode active material, a conductive material that can be contained in the negative electrode, and a current collector that can be contained in the negative electrode, may be used. Such a binder is not particularly limited, but, for example, carboxymethylcellulose, a crosslinked rubber latex of styrene-butadiene, an acrylic latex, and polyvinylidene fluoride are preferred. One of these may be used alone, or two or more thereof may be used in combination.

The current collector that can be contained in the negative electrode is not particularly limited but includes, for example, a metal foil such as copper, nickel and stainless steel; an expanded metal; a punched metal; a foamed metal; a carbon cloth; and a carbon paper. One of these may be used alone, or two or more thereof may be used in combination.

Furthermore, in the negative electrode mixture layer related to the negative electrode, it is preferable to adjust the content of the negative electrode active material to be from 88 weight % to 99 weight %, and/or adjust the content of the binder to be from 0.5 weight % to 12 weight %. In the case of using a conductive aid, the content of the conductive aid is preferably adjusted to be from 0.5 weight % to 12 weight %.

[Nonaqueous Electrolyte]

As the nonaqueous electrolyte used in the present embodiment, for example, a solution (nonaqueous electrolytic solution) obtained by dissolving a lithium salt in an organic solvent is used. The lithium salt is not particularly limited, and a known lithium salt may be used. Such a lithium salt is not particularly limited but includes, for example, $LiPF_6$ (lithium hexafluorophosphate), $LiClO_4$, $LiBF_4$, $LiAsF_6$, $Li_2SiF_6$, $LiOSO_2C_kF_{2k+1}$ [wherein k is an integer of 1 to 8], $LiN(SO_2C_kF_{2k+1})_2$ [wherein k is an integer of 1 to 8], $LiPF_n(C_kF_{2k+1})_{6-n}$ [wherein n is an integer of 1 to 5, and k is an integer of 1 to 8], $LiPF_4(C_2O_4)$, and $LiPF_2(C_2O_4)_2$. Among these, $LiPF_6$ is preferred. By using $LiPF_6$, the battery characteristics and safety tend to be excellent even at a high temperature. One of these lithium salts may be used alone, or two or more thereof may be used in combination.

The nonaqueous solvent used for the nonaqueous electrolyte in the present embodiment is not particularly limited, and a known solvent may be used. Such a nonaqueous solvent includes, for example, an aprotic polar solvent.

The aprotic polar solvent is not particularly limited but includes, for example, a cyclic carbonate such as ethylene carbonate, propylene carbonate, 1,2-butylene carbonate, 2,3-butylene carbonate, 1,2-pentylene carbonate, 2,3-pentylene carbonate, trifluoromethylethylene carbonate, fluoroethylene carbonate and 4,5-difluoroethylene carbonate; a lactone such as γ-butyrolactone and γ-valerolactone; a cyclic sulfone such as sulfolane; a cyclic ether such as tetrahydrofuran and dioxane; a linear carbonate such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate; a nitrile such as acetonitrile; a linear ether such as dimethyl ether; a linear carboxylic acid ester such as methyl propionate; and a linear ether carbonate compound such as dimethoxyethane. One of these may be used alone, or two or more thereof may be used in combination.

The nonaqueous electrolyte may contain other additives, if desired. Such an additive is not particularly limited but includes, for example, lithium salts other than those recited above, an unsaturated bond-containing carbonate, a halogen atom-containing carbonate, a carboxylic acid anhydride, a sulfur atom-containing compound (e.g., sulfide, disulfide, sulfonic acid ester, sulfite, sulfate, sulfonic acid anhydride), a nitrile group-containing compound, etc.

Specific examples of other additives are as follows:

lithium salts: for example, lithium monofluorophosphate, lithium difluorophosphate, lithium bis(oxalato) borate, lithium difluoro (oxalato) borate, lithium tetrafluoro (oxalato)phosphate, lithium difluorobis(oxalato)phosphate, etc.;

an unsaturated bond-containing carbonate: for example, vinylene carbonate, vinyl ethylene carbonate, etc.;

a halogen atom-containing carbonate: for example, fluoroethylene carbonate, trifluoromethylethylene carbonate, etc.;

a carboxylic acid anhydride: for example, acetic anhydride, benzoic anhydride, succinic anhydride, maleic anhydride, etc.;

a sulfur atom-containing compound: for example, ethylene sulfite, 1,3-propane sultone, 1,3-propene sultone, 1,4-butane sultone, ethylene sulfate, vinylene sulfate, etc.; and a nitrile group-containing compound: for example, succinonitrile, etc.

When the nonaqueous electrolyte contains the above-described other additives, the cycle characteristics of a battery tend to be more enhanced.

Among others, from the viewpoint of more enhancing the cycle characteristics of a battery, at least one selected from the group consisting of lithium difluorophosphate and lithium monofluorophosphate is preferred. The content of at least one additive selected from the group consisting of lithium difluorophosphate and lithium monofluorophosphate is preferably 0.001 weight % or more, more preferably 0.005 weight % or more, still more preferably 0.02 weight % or more, per 100 weight % of the nonaqueous electrolyte. When this content is 0.001 weight % or more, a cycle life of a lithium ion secondary battery tends to be more enhanced. In addition, this content is preferably 3 weight % or less, more preferably 2 weight % or less, still more preferably 1 weight % or less. When this content is 3 weight % or less, ion conductivity of a lithium ion secondary battery tends to be more enhanced.

The content of other additives in the nonaqueous electrolyte can be confirmed, for example, by NMR measurement, such as $^{31}$P-NMR, $^{19}$F-NMR, etc.

The concentration of a lithium salt in the nonaqueous electrolyte is preferably from 0.5 mol/L to 6.0 mol/L. From the viewpoint of lowering the viscosity of the nonaqueous electrolyte, the concentration of a lithium salt in the nonaqueous electrolyte is more preferably from 0.9 mol/L to 1.3 mol/L. The concentration of a lithium salt in the nonaqueous electrolyte can be selected according to the purpose.

Incidentally, in the present embodiment, the nonaqueous electrolyte may be a liquid electrolyte or may be a solid electrolyte.

EXAMPLES

The present invention is described in greater detail below by referring to Examples, but the present invention is not limited to these Examples. Note that unless otherwise indicated, various measurements and evaluations were carried out under the conditions of room temperature of 23° C., 1 atm., and a relative humidity of 50%.

<Evaluation of Winding Deviation of Roll>

A 65 mm-wide separator obtained was rolled up at a tension of 0.5 N and after winding 500 m and 1,000 m of the separator on a 3-inch plastic core and 6-inch plastic core, respectively, the winding end part was fixed by a tape. A cylinder having a flat cross-section was pressed against the entire outside region with respect to a place of 3 mm on the circumferential-direction outer side of the obtained roll, and the force (N) at which winding deviation occurs was measured.

<Evaluation of Life Characteristics of Nonaqueous Electrolyte Secondary Battery>

(Initial Charge/Discharge)

The obtained nonaqueous electrolyte secondary battery (hereinafter, sometimes simply referred to as "battery") was placed in a thermostatic chamber (Thermostatic Chamber PLM-73S, manufactured by Futaba Co., Ltd.) set at 25° C. and connected to a charge/discharge apparatus (Charge/Discharge Apparatus ACD-01, manufactured by Aska Electronic Co., Ltd.). Next, the battery was charged with a constant current of 0.05 C until reaching 4.35 V, then charged with a constant voltage of 4.35 V for 2 hours, and discharged to 3.0 V with a constant current of 0.2 C. In this regard, 1 C is a current value at which the battery is discharged in 1 hour.

(Cycle Test)

The battery after the initial charge/discharge above was placed in a thermostatic chamber (Thermostatic Chamber PLM-73S, manufactured by Futaba Co., Ltd.,) set at 60° C. and connected to a charge/discharge apparatus (Charge/Discharge Apparatus ACD-01, manufactured by Aska Electronic Co., Ltd.). Next, the battery was charged to 4.35 V with a constant current of 1.5 C and after reaching 4.35 V, the battery was held at a constant voltage of 4.35 V for 24 hours and discharged to 3.0 V with a constant current of 2 C. This series of charge/discharge was taken as one cycle, and a total of 300 cycles of charge/discharge were carried out. The retention rate of the discharge capacity after 300 cycles was evaluated.

The retention rate of the discharge capacity (unit: %) was calculated from the discharge capacity at the first cycle and the discharge capacity at the 300th cycle according to the following formula:

$$\text{Retention rate of discharge capacity}=(\text{discharge capacity at 300th cycle}/\text{discharge capacity at 1st cycle})\times 100$$

<Evaluation of Displacement of Electrode Laminate>

A cross-section in parallel to the winding direction in the central part of the battery was photographed using an X-ray CT scanner. The displacement of the electrode laminate was judged from the difference between the cross-sectional shape of the battery after first charge/discharge and the cross-sectional shape of the battery after 300 cycles. More specifically, the negative electrode current collector was divided every 0.5 cm, and the observation positions were set. The distance from the center of the battery to each observation position was determined after first charge/discharge and after 300 cycles, and a rate of change was determined as (distance after 300 cycles)/(distance after first charge/discharge), followed by averaging the obtained values.

Example 1

<Preparation of Substrate>

47.5 parts by weight of a polyethylene homopolymer having an Mv (viscosity average molecular weight) of 700,000, 47.5 parts by weight of a polyethylene homopolymer having an Mv of 250,000, and 5 parts by weight of a polypropylene homopolymer having an Mv of 400,000 were dry blended using a tumbler blender to obtain a polyolefin resin mixture. To 99 weight % of the obtained polyolefin resin mixture, 1 weight % of pentaerythrityl-tetrakis-[3-(3, 5-di-tert-butyl-4-hydroxyphenyl) propionate] was added as an antioxidant, and these were again dry blended using the tumbler blender to obtain a polyolefin resin composition.

After replacement by nitrogen, the obtained polyolefin resin composition was fed to a twin-screw extruder by a feeder under a nitrogen atmosphere. In addition, liquid paraffin (kinematic viscosity at 37.78° C.: $7.59\times10^{-5}$ $m^2/s$) was injected into a cylinder of the extruder by means of a plunger pump. The feeder and the pump were adjusted such that the proportion of the amount of the liquid paraffin in the entire mixture melt-kneaded and extruded by the twin-screw extruder was 66 weight % (the resin composition concentration was 34%). The melt-kneading conditions were a preset temperature of 200° C., a screw rotation speed of 100 rpm, and a discharge rate of 12 kg/h.

Subsequently, the melt-kneaded product was extruded through a T-die and cast on a cooling roll controlled to a surface temperature of 25° C. to obtain a gel sheet with a thickness of 2,200 μm. Next, the obtained gel sheet was guided to a simultaneous biaxial tenter stretching machine and stretched biaxially. The set stretching conditions were a MD stretch ratio of 7.3 times, a TD stretch ratio of 6.3 times, and a preset temperature of 125° C. Thereafter, the gel sheet after biaxial stretching was guided to a methyl ethyl ketone tank and sufficiently immersed in methyl ethyl ketone to extract and remove liquid paraffin, and then, methyl ethyl ketone was removed by drying. Finally, the gel sheet after drying was guided to a TD tenter, and stretched and thermally relaxed to obtain a polyolefin microporous membrane. The stretching temperature was 125° C., the thermal relaxation temperature was 133° C., the TD maximum stretch ratio was 1.65 times, and the relaxation rate was 0.9. The obtained polyolefin microporous membrane had a thickness of 12 μm and a porosity of 45%.

<Formation of Fine Pattern>

29 parts by weight of alumina and 0.29 parts by weight of an aqueous ammonium polycarboxylate solution (SN Dispersant 5468, produced by San Nopco, Ltd.) were mixed in 100 parts by weight of ion exchanged water, and the mixture was subjected to a bead mill treatment to adjust the average particle diameter (D50) to 450 nm to thereby obtain a dispersion liquid. Furthermore, per 100 parts by weight of the obtained dispersion liquid, 2.2 parts by weight of an acrylic latex suspension (solid content concentration: 40%, average particle diameter: 150 nm) as a binder and 2 parts by weight of polysaccharide as a thickener were mixed to prepare a uniform porous layer-forming composition. Incidentally, as for the average particle diameter of alumina in the dispersion liquid above, the particle diameter distribution was measured using a laser particle size distribution analyzer (Microtrac MT 3300EX, manufactured by Nikkiso Co., Ltd.), and the particle diameter at which the volume cumulative frequency becomes 50% was taken as the average particle diameter (μm). The average particle diameter was 0.7 μm or more. In addition, as for the average particle diameter of the resin latex binder, the volume average particle diameter (nm) was measured using a particle diameter measuring device (MICROTRACTMUPA 150, manufactured by Leed & Northrup Co.) by a light scattering method to determine the average particle diameter. The average particle diameter was 300 nm.

The obtained porous layer-forming composition was applied to a roll having formed thereon a pattern of circular patterns (diameter 0.5 mm), a square array and a 2-mm pitch (pattern occupation ratio: 20%) and after transferring the pattern onto the polyolefin microporous membrane, dried at 60° C. to remove ion exchanged water to thereby dispose a porous layer having a thickness of 30 μm. With respect to the obtained separator, the pattern shape parameter Rp/rp was calculated by observing the pattern. The obtained pattern was slit to a width of 65 mm, and 1,000 m of the separator was wound on a 6-inch plastic core, followed by attaching a tape to the winding end edge.

In addition, the obtained separator was laminated to a 500 nm-thick glass substrate coated with an acrylate-based pressure sensitive adhesive by arranging the fine pattern to face the glass substrate. After that, the separator was peeled off to thereby transfer the fine pattern to the glass substrate. Using this, the compressive modulus of the convex part was measured. Also, the compressive modulus of the polyolefin microporous membrane was measured as well.

Furthermore, the obtained separator was measured for the air permeability of the convex part and the air permeability of the concave part.

Moreover, the obtained separator was split in a direction parallel to the MD direction, and the cross-section of the pattern portion was observed by a scanning microscope (SEM). From this observation, the numerical value Ri/ri was calculated as a particle shape parameter.

As described above, the force at which winding deviation occurs was measured by pressing a cylinder having a flat cross-section against the entire outside region with respect to a place of 3 mm on the circumferential-direction outer side of the obtained roll.

<Production of Positive Electrode>

$LiNi_{0.5}Co_{0.2}Mn_{0.3}O_2$ as a positive electrode active material, an acetylene black powder as a conductive assistant, and a polyvinylidene fluoride solution as a binder were mixed at a solid content ratio by weight of 93.9:3.3:2.8. To the obtained mixture, N-methyl-2-pyrrolidone was added as a dispersion solvent to give a solid content of 35 weight %, and the mixture was further mixed to prepare a slurry-like solution. The slurry-like solution was applied to both surfaces of a 10 μm-thick aluminum foil. At this time, part of the aluminum foil was exposed. Thereafter, the solvent was removed by drying, and the residue was rolled with a roll press. The sample after rolling was trimmed such that the size of the coated part was 300 mm×50 mm and the exposed part of the aluminum foil was included.

<Production of Negative Electrode>

A graphite powder as a negative electrode active material, and a styrene butadiene rubber and an aqueous carboxymethylcellulose solution as binders were mixed at a solid content ratio by weight of 97.5:1.5:1.0. The obtained mixture was added to water serving as a dispersion solvent to give a solid content concentration of 45 weight % to thereby prepare a slurry-like solution. The slurry-like solution was applied to one surface or both surfaces of a 10 μm-thick copper foil. At this time, part of the aluminum foil was exposed. Thereafter, the solvent was removed by drying, and the residue was rolled with a roll press. The sample after rolling was trimmed such that the size of the coated part was 320 mm×52 mm and the exposed part of the copper foil was included.

<Production of Nonaqueous Electrolyte>

$LiPF_6$ was dissolved at 1 mol/L in a mixed solvent obtained by mixing ethylene carbonate (EC) and ethyl methyl carbonate (EMC) at a volume ratio of 1:2 in an argon gas atmosphere, to obtain a nonaqueous electrolyte (nonaqueous electrolytic solution).

<Manufacture of Nonaqueous Electrolyte Battery and Evaluation of Life Characteristics>

The positive electrode and the negative electrode were stacked one on top of another while letting two sheets of the separator intervene and wound into an elliptical shape, and a pressure of about 4 kN/cm$^2$ was applied to the side surface of the roll (pressure application) over about 2 minutes to thereby prepare a flat wound electrode body. Incidentally, the porous film having a fine pattern was disposed by arranging the fine pattern side to oppose the negative electrode. A positive electrode lead terminal and a negative electrode lead terminal were attached respectively to the positive electrode active material layer non-forming part and negative electrode active material layer non-forming part of the electrode wound body by ultrasonic welding. This laminated electrode body was inserted into an aluminum laminate outer package of 80×60 mm. Next, the nonaqueous electrolyte (nonaqueous electrolytic solution) above was injected into the outer package and after that, the opening of the outer package was closed to manufacture a nonaqueous electrolyte battery (lithium ion secondary battery) (hereinafter, sometimes simply referred to as "battery") having a laminated electrode body inside. The rated capacity of the obtained nonaqueous electrolyte battery was 1,800 mAh. With respect to the manufactured battery, first charge/discharge and a cycle test were conducted, and the capacity retention rate was calculated.

<Evaluation of Displacement of Electrode Laminate>

As described above, an average rate of change of (distance after 300 cycles)/(distance after first charge/discharge) was determined using an X-ray CT scanner.

Examples 2 to 4

The test was carried out in the same manner as in Example 1, and only the pattern height was changed.

Example 5

The porous layer-forming composition used in Example 1 was applied throughout the surface on one side of the polyolefin microporous membrane used in Example 1 by using a microgravure coater and dried at 60° C. to remove the ion exchanged water to thereby dispose a porous layer having a thickness of 4 μm.

On this layer, a fine pattern was formed by the same method as in Example 1. With respect to the obtained separator, the test was carried out in the same manner as in Example 1.

Comparative Example 1

The polyolefin microporous membrane of Example 1 was wound and subjected to the test in the same manner as in Example 1.

Comparative Example 2

The test was carried out in the same manner as in Example 1, and only the pattern height was changed.

Comparative Example 3

The porous layer-forming composition used in Example 1 was applied throughout the surface on one side of a polyolefin microporous membrane having a thickness of 20 μm and a porosity of 45% by using a microgravure coater and dried at 60° C. to dispose a porous layer having a thickness of 20 μm. On this porous layer, the same porous membrane-forming composition as above was intermittently applied to a thickness of 5 μm and a width of 1 cm at a coating pitch of 10 cm in the same manner as in Example 22 of Patent Literature 6 to partially form a convex part. With respect to the obtained separator, the test was carried out in the same manner as in Example 1.

The results are shown in Tables 1 and 2.

[Table 1]

TABLE 1

| | Compressive Modulus | | Height | | | Air Permeability | | | | Pattern | Particle |
|---|---|---|---|---|---|---|---|---|---|---|---|
| | | | Film | | | Convex | Concave | | Pattern | Shape | Shape |
| | Convex Part | Lowest Layer | Thickness T2 | Pattern T1 | Ratio T1/T2 | Part S1 | Part S2 | Ratio S1/S2 | Occupation Ratio | Parameter Rp/rp | Parameter Ri/ri |
| | Unit | | | | | | | | | | |
| Item | MPa | MPa | μm | μm | — | sec | sec | — | % | — | — |
| Example 1 | $1.3 \times 10^3$ | 93 | 42 | 30 | 0.71 | 240 | 172 | 1.40 | 20 | 1 | 3 |
| Example 2 | $1.2 \times 10^3$ | 95 | 22 | 10 | 0.45 | 213 | 172 | 1.24 | 20 | 1 | 3 |
| Example 3 | $1.1 \times 10^3$ | 86 | 32 | 20 | 0.63 | 219 | 172 | 1.27 | 20 | 1 | 3 |
| Example 4 | $1.3 \times 10^3$ | 102 | 62 | 50 | 0.81 | 255 | 172 | 1.48 | 20 | 1 | 3 |
| Example 5 | $1.2 \times 10^3$ | 90 | 36 | 20 | 0.56 | 244 | 180 | 1.36 | 20 | 1 | 3 |
| Comparative Example 1 | — | 94 | 12 | — | 0.00 | 173 | 173 | 1.00 | 0 | — | — |
| Comparative Example 2 | $1.2 \times 10^3$ | 95 | 13.5 | 1.5 | 0.11 | 190 | 172 | 1.10 | 20 | 1 | 3 |
| Comparative Example 3 | $1.3 \times 10^3$ | 98 | 45 | 5 | 0.11 | 330 | 252 | 1.31 | 10 | — | 3 |

[Table 2]

TABLE 2

| Item | Results | | |
|---|---|---|---|
| | Winding Deviation of Roll N | Capacity Retention Rate After 300 Cycles % | Displacement of Electrode Laminate — |
| Example 1 | 10 | 82 | 0.02 |
| Example 2 | 8 | 88 | 0.03 |
| Example 3 | 8 | 89 | 0.05 |
| Example 4 | 13 | 82 | 0.03 |
| Example 5 | 9 | 81 | 0.05 |
| Comparative Example 1 | 2 | 69 | 0.10 |
| Comparative Example 2 | 3 | 70 | 0.10 |
| Comparative Example 3 | 3 | 71 | 0.09 |

In Examples 1 to 5, a good roll having high resistance to a stress in the transverse direction of the roll and being resistant to occurrence of winding deviation was obtained. Also, the batteries manufactured using the separators of Examples 1 to 5 exhibited good capacity retention characteristics, and this is considered to be achieved because winding deviation within the battery could be suppressed. These separators showed a good result in all evaluation items, compared with the separators of Comparative Examples 1 to 3.

INDUSTRIAL APPLICABILITY

The porous film according to the present embodiment and the nonaqueous electrolyte secondary battery according to the present embodiment can be utilized respectively as a separator for nonaqueous electrolyte secondary batteries, etc. and as a power source for various consumer appliances, a power source for automobiles, etc.

REFERENCE SIGNS LIST

10: Substrate
11: Fine pattern
11*a*: Convex part
11*b*: Concave part

The invention claimed is:

1. A separator for use in a nonaqueous electrolyte battery, wherein the separator comprises a laminate structure of a substrate comprising a plurality of layers including a polyolefin microporous membrane layer, and a convex-shaped patterns porous layer having a plurality of convex-shaped patterns, each convex-shaped pattern of the plurality of convex-shaped patterns being independently laminated on at least one main surface of the substrate, the value of T1/T2 represented using the distance (T1) between a substantially flat surface formed at the top of the convex-shaped patterns and a substantially flat surface formed at the bottom of the convex-shaped patterns and the total thickness (T2) of the separator is 0.45 or more and less than 1, the compressive modulus of the convex-shaped patterns layer is within the range of $1.1\times10^3$ MPa to $1.3\times10^3$ MPa, and the compressive modulus of the layer having the lowest compressive modulus in the layers constituting the substrate is within the range of 86 MPa to 102 MPa, the compressive modulus of the convex-shaped patterns porous layer is higher than the compressive modulus of all of the plurality of layers constituting the substrate, the convex-shaped patterns porous layer having the convex-shaped patterns contains inorganic particles or resin fine particles, and a content of the inorganic particles or resin fine particles is 80 weight % or more and 99.99 weight % or less, per 100 weight % of the convex-shaped patterns porous layer, S1/S2 represented using a ratio of the air permeability S1 of a portion having the convex-shaped patterns, measured in the vertical direction of the convex-shaped patterns, to the air permeability S2 of a non-pattern part of the separator is 0.8 or more and 5 or less, and the air permeability S1 is 255 seconds/100 ml or less.

2. The separator according to claim 1, wherein the ratio of the area surrounded by bottom portions of the convex-shaped patterns to the area of a unit grid is 0.03 or more and 0.80 or less.

3. The separator according to claim 1, wherein the distance (T1) between a substantially flat surface formed at the top of the convex-shaped patterns and a substantially flat surface formed at the bottom of the convex-shaped patterns is 6 μm or more.

4. The separator according to claim 1, wherein each of the plurality of convex-shaped patterns are spatially separated from each other.

5. The separator according to claim 1, wherein the plurality of convex-shaped patterns are arranged in a pattern having a long axis (L) and a pattern pitch (P), and wherein a ratio L/P is 0.01 or more and 0.90 and less.

6. The separator according to claim 5, wherein the ratio L/P is 0.10 or more and 0.80 and less.

7. The separator according to claim 1, wherein the ratio of the area surrounded by bottom portions of the convex-shaped patterns to the area of a unit grid is 0.03 or more and 0.80 or less, wherein the distance (T1) between a substantially flat surface formed at the top of the convex-shaped patterns and a substantially flat surface formed at the bottom of the convex-shaped patterns is 6 μm or more, wherein the plurality of convex-shaped patterns are arranged in a pattern having a long axis (L) and a pattern pitch (P), and wherein a ratio L/P is 0.10 or more and 0.80 and less.

8. The separator according to claim 1, wherein the content of the inorganic particles or resin fine particles is 90 weight % or more and 99 weight % or less, per 100 weight % of the convex-shaped patterns porous layer.

9. The separator according to claim 1, wherein the content of the inorganic particles or resin fine particles is 88.3 weight % or more and 99.99 weight % or less, per 100 weight % of the convex-shaped patterns porous layer.

10. The separator according to claim 1, wherein the S1/S2 is 0.8 or more and 1.48 or less.

11. The separator according to claim 1, wherein the value of T1/T2 is 0.45 or more and 0.81 or less.

12. A roll obtained by winding the separator according to claim 1 on a winding core.

13. A nonaqueous electrolyte battery comprising:

a laminate having stacked therein a positive electrode, the separator according to claim 1, and a negative electrode, or a roll of the laminate; and a nonaqueous electrolyte.

* * * * *